US012438802B2

United States Patent
Xie et al.

(10) Patent No.: US 12,438,802 B2
(45) Date of Patent: Oct. 7, 2025

(54) NEXT HOP DETERMINING METHOD AND APPARATUS

(71) Applicant: Huawei Technologies Co., Ltd., Shenzhen (CN)

(72) Inventors: Jingrong Xie, Beijing (CN); Heng Wang, Shenzhen (CN); Fanghong Duan, Nanjing (CN); Gang Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 302 days.

(21) Appl. No.: 18/309,532

(22) Filed: Apr. 28, 2023

(65) Prior Publication Data

US 2023/0269165 A1    Aug. 24, 2023

Related U.S. Application Data

(63) Continuation of application No. PCT/CN2021/116119, filed on Sep. 2, 2021.

(30) Foreign Application Priority Data

Oct. 30, 2020  (CN) .......................... 202011193045.7
Feb. 10, 2021  (CN) .......................... 202110184092.3

(51) Int. Cl.
*H04L 45/02*    (2022.01)
*H04L 45/12*    (2022.01)

(52) U.S. Cl.
CPC .............. *H04L 45/02* (2013.01); *H04L 45/12* (2013.01)

(58) Field of Classification Search
CPC ................................ H04L 45/02; H04L 45/12
(Continued)

(56) References Cited

U.S. PATENT DOCUMENTS 10,033,641 B2 *  7/2018  Callon ................... H04L 45/74
2015/0207736 A1  7/2015  Roch et al.
(Continued)

FOREIGN PATENT DOCUMENTS

CN        106209629 A    12/2016
CN        106506367 A     3/2017
(Continued)

OTHER PUBLICATIONS

Wijnands, IJ., Ed., et al., "Multicast Using Bit Index Explicit Replication (BIER)", Internet Engineering Task Force (IETF), RFC8279, Nov. 2017, 43 pages, XP055753750.
(Continued)

*Primary Examiner* — Anthony Mejia
(74) *Attorney, Agent, or Firm* — Conley Rose, P.C.

(57) ABSTRACT

A next-hop determining method is applied to a BIER domain based on bit index forwarding routing, and includes: A third device obtains first BIER information of a first device, an attribute of the first device, second BIER information of a second device, and an attribute of the second device, where the first BIER information includes a BFR-id of an edge BFR in a sub-domain, and the second BIER information includes the BFR-id of the edge BFR in the sub-domain. The third device determines, based on the first BIER information, the second BIER information, the attribute of the first device, and the attribute of the second device, a next hop to the edge BFR in the sub-domain.

20 Claims, 7 Drawing Sheets

(58) Field of Classification Search
USPC .......................................................... 370/389
See application file for complete search history.

(56) References Cited

U.S. PATENT DOCUMENTS

| | | | |
|---|---|---|---|
| 2016/0127139 A1 | 5/2016 | Tian et al. | |
| 2016/0134535 A1 | 5/2016 | Callon | |
| 2017/0126481 A1* | 5/2017 | Pignataro | H04L 43/10 |
| 2024/0356835 A1* | 10/2024 | Chen | H04L 45/22 |

FOREIGN PATENT DOCUMENTS

| | | |
|---|---|---|
| CN | 106656524 A | 5/2017 |
| CN | 110460522 A | 11/2019 |
| CN | 110784411 A | 2/2020 |
| EP | 4027597 A1 | 7/2022 |

OTHER PUBLICATIONS

Rosen, E. Ed., et al., "Multicast VPN Using Bit Index Explicit Replication (BIER)," Internet Engineering Task Force (IETF), RFC 8556, Apr. 2018, 17 pages.
Z. Zhang et al., "BIER Prefix Redistribute," draft-ietf-bier-prefix-redistribute-00, Internet-Draft, Intended status: Standards Track, Aug. 4, 2020, 12 pages.
"IS-IS TLV Codepoints," May 6, 2003, 20 pages.
S. Previdi, et al., "A Policy Control Mechanism in IS-IS Using Administrative Tags," Network Working Group, RFC 5130, Feb. 2008, 8 pages.
L. Ginsberg, Ed., et al., "IS-IS Prefix Attributes for Extended IPv4 and IPv6 Reachability," Internet Engineering Task Force (IETF), RFC 7794, Category:Standards Track, Mar. 2016, 9 pages.
L. Ginsberg, Ed., et al., "Bit Index Explicit Replication (BIER) Support via IS-IS," Internet Engineering Task Force (IETF), RFC 8401, Jun. 2018, 12 pages.
P. Psenak, Ed., et al., "OSPFv2 Extensions for Bit Index Explicit Replication (BIER)," Internet Engineering Task Force (IETF), RFC 8444, Nov. 2018, 12 pages.

\* cited by examiner

NEXT HOP DETERMINING METHOD AND APPARATUS

CROSS-REFERENCE TO RELATED APPLICATIONS

This is a continuation of Int'l Patent App. No. PCT/CN2021/116119, filed on Sep. 2, 2021, which claims priority to Chinese Patent App. No. 202011193045.7, filed on Oct. 30, 2020, and Chinese Patent App. No. 202110184092.3, filed on Feb. 10, 2021, all of which are incorporated by reference.

FIELD

The present disclosure relates to the field of communications technologies, and in particular, to a next hop determining method and apparatus.

BACKGROUND

In a Bit Index Explicit Replication (BIER) domain, a bit forwarding ingress router (BFIR) or a first transit bit forwarding router (BFR) may receive BIER information flooded by another BFR (for example, a second transit BFR or a bit forwarding egress router (BFER)) in the BIER domain through an interior gateway protocol (IGP). The BIER information includes: a BFR prefix of the BFR that sends the BIER information, a bit forwarding router identifier (BFR-id) of one or more BFERs, and a BFR prefix thereof. The BFR prefix indicates an address of the BFR in the BIER domain. The BFIR or the first transit BFR may obtain a bit index forwarding table (BIFT) based on the BIER information flooded through the IGP. A BIFT entry includes a forwarding bitmask (F-BM) and a BFR neighbor (BFR-NBR) that serves as a next hop. A bit that is set to 1 in a bit string included in the F-BM corresponds to the BFER in the received BIER information. An address in the BFR-NBR is the BFR prefix of the BFR that sends the BIER information and that is included in the BIER information. When there are two transit BFRs in the BIER domain, for example, a second BFR and a third BFR, and the advertised BIER information includes same BFER parameters, for example, a BFR-id of the BFER and a BIER prefix of the BFER, the BFR such as the BFIR or the first BFR that receives the BIER information from the second BFR and the third BFR may select the BIER information advertised by a BFR according to a longest match policy or an equal-cost multi-path routing (ECMP) policy. A current next hop determining method is not flexible enough.

SUMMARY

Embodiments of this disclosure provide a next hop determining method and apparatus, to improve flexibility.

According to a first aspect, a next hop determining method is provided, where the method is applied to a BIER domain based on bit index forwarding routing and includes:

A third device obtains first BIER information of a first device, an attribute of the first device, second BIER information of a second device, and an attribute of the second device, where the first BIER information includes a BFR-id of an edge BFR in a sub-domain, and the second BIER information includes the BFR-id of the edge BFR in the sub-domain; and the third device determines a next hop to the edge BFR in the sub-domain based on the first BIER information, the second BIER information, the attribute of the first device, and the attribute of the second device.

In the foregoing method, the third device may flexibly select the next hop to the edge BFR of the sub-domain based on the attribute of the first device and the attribute of the second device, and selection is not limited to a longest match policy or an ECMP policy, so that flexibility of determining the next hop is improved.

In a possible design, the attribute of the first device and the attribute of the second device include a first identifier, and the first identifier is used to identify an anycast BFR prefix; and the method further includes: When the first BIER information is the same as the second BIER information, and the attribute of the first device and the attribute of the second device include the first identifier, the third device determines the next hop to the edge BFR in the sub-domain.

In a possible design, the attribute of the first device or the attribute of the second device includes a first identifier, the first identifier is used to identify an anycast BFR prefix, and that the third device determines a next hop to the edge BFR in the sub-domain based on the first BIER information, the second BIER information, the attribute of the first device, and the attribute of the second device includes: When the first BIER information is the same as the second BIER information, the third device determines a device whose attribute includes the first identifier as the next hop.

In a possible design, the method further includes: The third device outputs an alarm when the first BFR information is the same as the second BIER information, and neither the attribute of the first device nor the attribute of the second device includes a first identifier, where the first identifier is used to identify an anycast BFR prefix.

In a possible design, the attribute of the first device further includes a node identifier of the first device, the attribute of the second device includes a node identifier of the second device, and that the third device determines a next hop to the edge BFR in the sub-domain based on the first BIER information, the second BIER information, the attribute of the first device, and the attribute of the second device includes: When the first BIER information is the same as the second BIER information, the third device determines one of the first device and the second device as the next hop according to a first policy and based on the node identifier of the first device and the node identifier of the second device, where the first policy includes using a device with a large node identifier as the next hop or using a device with a small node identifier as the next hop.

In a possible design, the attribute of the first device further includes a second identifier, the attribute of the second device further includes a third identifier, the second identifier is used to identify a priority of the first device, the third identifier is used to identify a priority of the second device, and that the third device determines a next hop to the edge BFR in the sub-domain based on the first BIER information, the second BIER information, the attribute of the first device, and the attribute of the second device includes: When the first BIER information is the same as the second BIER information, the third device determines one of the first device and the second device as the next hop according to a second policy and based on the second identifier and the third identifier, where the second policy includes using a device with a high priority as the next hop or using a device with a low priority as the next hop.

In a possible design, the attribute of the first device includes a BFR prefix of the first device, the attribute of the second device includes a BFR prefix of the second device, the BFR prefix of the first device is different from the BFR prefix of the second device, and that the third device determines a next hop to the edge BFR in the sub-domain based on the first BIER information, the second BIER information, the attribute of the first device, and the attribute of the second device includes: When the first BIER information is the same as the second BIER information, the third device determines one of the first device and the second device as the next hop according to a third policy and based on a cost value of a first link and a cost value of a second link, where the third policy includes using a peer device of a link with a small cost value as the next hop or using a peer device of a link with a large cost value as the next hop, the first link is a link from the third device to the first device, and the second link is a link from the third device to the second device.

In a possible design, the attribute of the first device includes a BFR prefix of the first device, the attribute of the second device includes a BFR prefix of the second device, the BFR prefix of the first device is different from the BFR prefix of the second device, and that the third device determines a next hop to the edge BFR in the sub-domain based on the first BIER information, the second BIER information, the attribute of the first device, and the attribute of the second device includes: When the first BIER information is the same as the second BIER information, the third device determines one of the first device and the second device as the next hop according to a fourth policy and based on the BFR prefix of the first device and the BFR prefix of the second device, where the fourth policy includes using a device with a small BFR prefix as the next hop or using a device with a large BFR prefix as the next hop.

In a possible design, the attribute of the first device includes a BFR prefix of the first device and a node identifier of the first device, the attribute of the second device includes a BFR prefix of the second device and a node identifier of the second device, the BFR prefix of the first device is different from the BFR prefix of the second device, and that the third device determines a next hop to the edge BFR in the sub-domain based on the first BIER information, the second BIER information, the attribute of the first device, and the attribute of the second device includes: When the first BIER information is the same as the second BIER information, the third device determines one of the first device and the second device as the next hop according to a first policy and based on the node identifier of the first device and the node identifier of the second node, where the first policy includes using a device with a large node identifier as the next hop or using a device with a small node identifier as the next hop.

In a possible design, the attribute of the first device includes a BFR prefix of the first device and a second identifier, the attribute of the second device includes a BFR prefix of the second device and a third identifier, the second identifier is used to identify a priority of the first device, the third identifier is used to identify a priority of the second device, the BFR prefix of the first device is different from the BFR prefix of the second device, and that the third device determines a next hop to the edge BFR in the sub-domain based on the first BIER information, the second BIER information, the attribute of the first device, and the attribute of the second device includes: When the first BIER information is the same as the second BIER information, the third device determines one of the first device and the second device as the next hop according to a second policy and based on the second identifier and the third identifier, where the second policy includes using a device with a high priority as the next hop or using a device with a low priority as the next hop.

According to a second aspect, a next hop determining apparatus is provided. The apparatus includes units for implementing functions of steps included in any one of the first aspect or the possible designs of the first aspect.

According to a third aspect, a system is provided. The system includes the next hop determining apparatus according to any one of the second aspect or the possible designs of the second aspect.

According to a fourth aspect, a chip is provided. The chip includes a memory and a processor, the memory is configured to store computer instructions, and the processor is configured to: invoke the computer instructions from the memory and run the computer instructions, to perform the next hop determining method according to any one of the first aspect or the possible implementations of the first aspect.

According to a fifth aspect, a computer program product is provided. The computer program product includes one or more computer program instructions. When the computer program instructions are loaded and executed by a computer, the computer performs the next hop determining method according to any one of the first aspect or the possible implementations of the first aspect.

According to a sixth aspect, a computer-readable storage medium is provided. The computer-readable storage medium is configured to store instructions, and the instructions include a program designed for performing the next hop determining method according to any one of the first aspect or the possible implementations of the first aspect.

DETAILED DESCRIPTION

To make the purpose, technical solutions, and advantages of embodiments of the present disclosure clearer, the following clearly and completely describes the technical solutions of embodiments of the present disclosure with reference to the accompanying drawings in embodiments.

Figure 1:
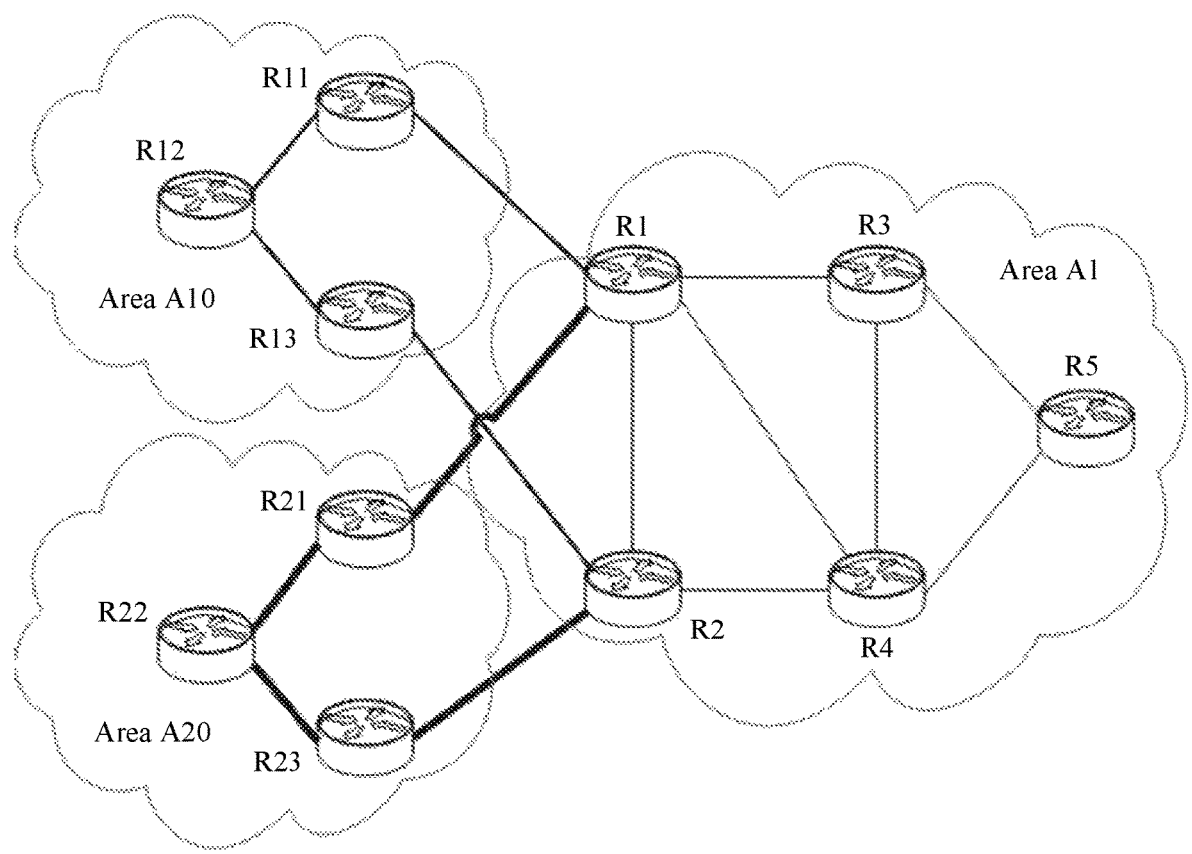
FIG. 1 is a schematic diagram of a network scenario.

FIG. 1 is a schematic diagram of a network scenario. In the network scenario shown in FIGS. 1, R1, R2, R3, R4, R5, R11, R12, R13, R21, R22, and R23 represent BFRs in a BIER domain. R1, R2, R3, R4, and R5 are located in a same IGP area, and the area may be referred to as an area A1. A BFR-id configured for R1 is 1. A BFR-id configured for R2 is 2. A BFR-id configured for R3 is 3. A BFR-id configured for R4 is 4. A BFR-id configured for R5 is 5. R3, R4, and R5 are edge BFRs. R1 and R2 can function as area border routers (ABRs). When R1 and R2 do not function as BFERs, no BFR-id needs to be configured for R1 and R2, or a configured BFR-id is invalid. R11, R12, and R13 are located in a same IGP area, and the area may be referred to as an area A10. R11, R12, and R13 are all edge BFRs, such as BFERs. A BFR-id configured for R11 is 11. A BFR-id configured for R12 is 12. A BFR-id configured for R13 is 13. R21, R22, and R23 are located in a same IGP area, and the area may be referred to as an area A20. R21, R22, and R23 are all edge BFRs, such as BFERs. A BFR-id configured for R21 is 21. A BFR-id configured for R22 is 22. A BFR-id configured for R23 is 23. In the scenario shown in FIGS. 1, R1 and R2 flood BIER information of R11, R12, R13, R21, R22, and R23 to BFRs in the area A1, such as R3, R4, and R5. R1 and R2 also flood BIER information of R3, R4, and R5 to BFRs in the area A10, such as R11, R12, and R13, and BFRs in the area A20, such as R21, R22, and R23. A method for R1 and R2 to advertise obtained BIER information to the BFRs in the area A1 is the same as a method for advertising obtained BIER information to the BFRs in the area A10 and the BFRs in the area A20. The following uses the method for R1 and R2 to advertise obtained BIER information to the BFRs in the area A1 as an example for description.

In the scenario shown in FIGS. 1, R1 and R2 may obtain the BFR-ids of BFRs that serve as the edge BFRs directly or indirectly from the BFRs of the area A10 and the BFRs of the area A20, for example, BFR-ids whose values are 11, 12, 13, 21, 22, and 23. The BIER information advertised by R1 to the area A1 includes BFR-ids whose values are 11, 12, 13, 21, 22, and 23. The BIER information advertised by R2 to the area A1 includes BFR-ids whose values are 11, 12, 13, 21, 22, and 23. R1 and R2 may advertise BFR-ids whose values are 11, 12, 13, 21, 22, and 23 by using a BFR-id range sub-type-length-value (sub-TLV). The BFR-id range sub-TLV may be carried by using a BIER proxy range sub-TLV defined by draft-ietf-bier-prefix-redistribute-00. For example, the BIER proxy range sub-TLV may include BFR-id=11 and range=3, and the sub-TLV indicates three BFR-ids starting from the BFR-id 11, that is, the BFR-ids are three values of 11, 12, and 13. The BIER proxy range sub-TLV may further include BFR-id=21 and range=3, and the sub-TLV indicates three BFR-ids starting from the BFR-id 21, that is, the BFR-ids are three values of 21, 22, and 23. When one or more of R1 and R2 may serve as a BFER, the device serving as the BFER may carry the BFR-id configured on the device in the advertised BIER information. For example, when R1 may serve as a BFER, the BIER information advertised by R1 to the area A1 further includes a valid BFR-id allocated to R1. When R2 may serve as a BFER, the BIER information advertised by R2 to area A1 further includes a valid BFR-id allocated to R2. In a possible implementation, R1 may use a host prefix of R1 when advertising the BIER information, and R2 may use a host prefix of R2 when advertising the BIER information. The host prefix is a prefix that is with a 32-bit mask in an Internet Protocol version 4 (IPv4) network, and has a complete IPv4 address as information thereof. Alternatively, the host prefix is a prefix with a 128-bit mask in an Internet Protocol version 6 (IPV6) network, and has a complete IPv6 address as information thereof. In another possible implementation, R1 may use a non-host route prefix representing R1 to advertise the BIER information to the area A1, for example, a 64-mask IPv6 address as a locator to identify R1; or draft-ietf-bier-prefix-redistribute-00 uses an aggregated route or a default route to carry the BIER information advertised by R1. R2 may use a non-host route prefix representing R2 to advertise the BIER information to the area A1, for example, a 64-bitmask IPV6 address as a locator to identify R2; or draft-ietf-bier-prefix-redistribute-00 uses an aggregated route or a default route to carry the BIER information advertised by R2.

R1 in FIG. 1 may separately receive the BFR-ids advertised by R11, R12, and R13 in the area A10, receive the BFR-ids advertised by R21, R22, and R23 in the area A20, and receive the BIER information advertised by R2. The BFR-id whose value is 11 is used as an example. R11 uses an Internet Protocol (IP) address of R11 as the BFR-prefix and advertises the BFR-prefix together with the BFR-id whose value is 11. For example, a BIER-info sub-TLV (a type value is 32) defined in RFC8401 is carried in ISIS messages of which type=135, 235, 236, and 237, or a BIER sub-TLV (a type value is 9) defined in RFC8444 is carried in an OSPFv2 extended prefix type-length-value (TLV). The sub-TLV may be used to carry the IP address of R11 and the BFR-id whose value is 11. The information advertised by R1 may be expressed as (BFR-prefix=IP address of R11, BIER-info<Sub-domain=0, BFR-id=11>). The BFR-id of R11 advertised by R2 may be carried in a BIER proxy range sub-TLV defined by draft-ietf-bier-prefix-redistribute-00, and the TLV may further carry a BFR-prefix whose value is the IP address of R2. The information advertised by R2 can be expressed as (BFR-prefix=2.2.2.2, BIER-info<Sub-domain=0, BFR-id=2>, BFR-id-range<BFR-id-range=11 to 13, 21 to 23>), where 2.2.2.2 is the IP address of R2, and BFR-id=2 is a valid BFR-id value of R2. R1 may use information advertised by R11 through a BIER-info TLV or a BIER sub-TLV to establish a bit index routing table (BIRT) entry and a BIFT entry to R11. The BIRT entry and the BIFT entry established by R1 to R11 include the BFR-id whose value is 11, the BFR-prefix of R11 as a next hop, and an interface connecting R1 to R11 as an outbound interface.

According to the foregoing method, R1 may select information advertised by R12 for BFR-id=12, and establishes a BIRT entry and a BIFT entry to BFR-id=12. The BIRT entry and the BIFT entry established by R1 to R12 include the BFR-id whose value is 12, a BFR-prefix of R12 as a next hop, and an interface connecting R1 to R12 as an outbound interface. A method for establishing a BIRT entry and a BIFT entry to R13, R21, R22, and R23 by R1 is the same as the method for establishing the foregoing BIRT entry and BIFT entry, and details are not described herein again. A method for establishing a BIRT entry and a BIFT entry by R2 is the same as the method used by R1, and details are not described herein again. Each device of R3, R4, and R5 in the area A1 receives the BIER information advertised by R1 and the BIER information advertised by R2. When the BIER information advertised by R1 and R2 further includes the BFR-id of R1, each of R3, R4, and R5 establishes a BIRT entry and a BIFT entry to R1 based on BFR-id=1 advertised by R1. An establishment method is the same as the method used by R1, and details are not described herein again. When the BIER information advertised by R1 and R2 further includes the BFR-id of R2, each of R3, R4, and R5 establishes a BIRT entry and a BIFT entry to R2 based on BFR-id=2 advertised by R2. An establishment method is the same as the method used by R1, and details are not described herein again. The BIRT entry includes node information of a next hop to the BFR-id, and may be represented by (BFR-id, NextHop). For example, a BIRT entry includes (BFR-id=11, NextHop=R1), and the BIRT entry indicates that a next hop to a BFER of BFR-id=11 is R1. The BIFT entry includes node information of a next hop to a BFR-id and a forwarding bitmask (FBM), and may be represented by (BFR-id, NextHop, FBM). For example, one BIFT entry includes (BFR-id=11, NextHop=R1, FBM=01110000), where three 1-bit bits in the FBM may correspond to BFERs whose BFR-ids are 11, 12, and 13 respectively.

Each one of the three devices of R3, R4, and R5 in the area A1 can receive the BIER information advertised by R1 and the BIER information advertised by R2. Both the BIER information advertised by R1 and the BIER information advertised by R2 include BFR-ids whose values are 11, 12, 13, 21, 22, and 23. R3, R4, or R5 can determine the next hop and outbound interface based on the route that advertises the BFR-ids whose values are 11, 12, 13, 21, 22, and 23 and a longest match algorithm, but the device selected to advertise the BIER information is not a device with optimal performance, and flexibility and forwarding performance need to be improved.

According to the method provided in this embodiment, a problem of how one or more of R3, R4, and R5 select a next hop with optimal performance in a scenario in which R1 and R2 in FIG. 1 advertise a same BFR-id can be resolved. In this embodiment, an example in which both R1 and R2 advertise the BFR-ids of the devices used as BFERs in the area A10, and R3 and R4 in the area A1 select a next hop by using the method according to this embodiment is used for description. A method used by another edge BFR in the area A1, for example, R5, is the same as the method used by R3 or R4, and details are not described in this embodiment again. For a method for selecting a next hop by the edge BFR in the area A1 for advertising the BFR-ids of the devices used as the BFERs in the area A20 by both R1 and R2, refer to the method used by R3 or R4. Details are not described again in this embodiment.

Embodiment 1

Figure 2:
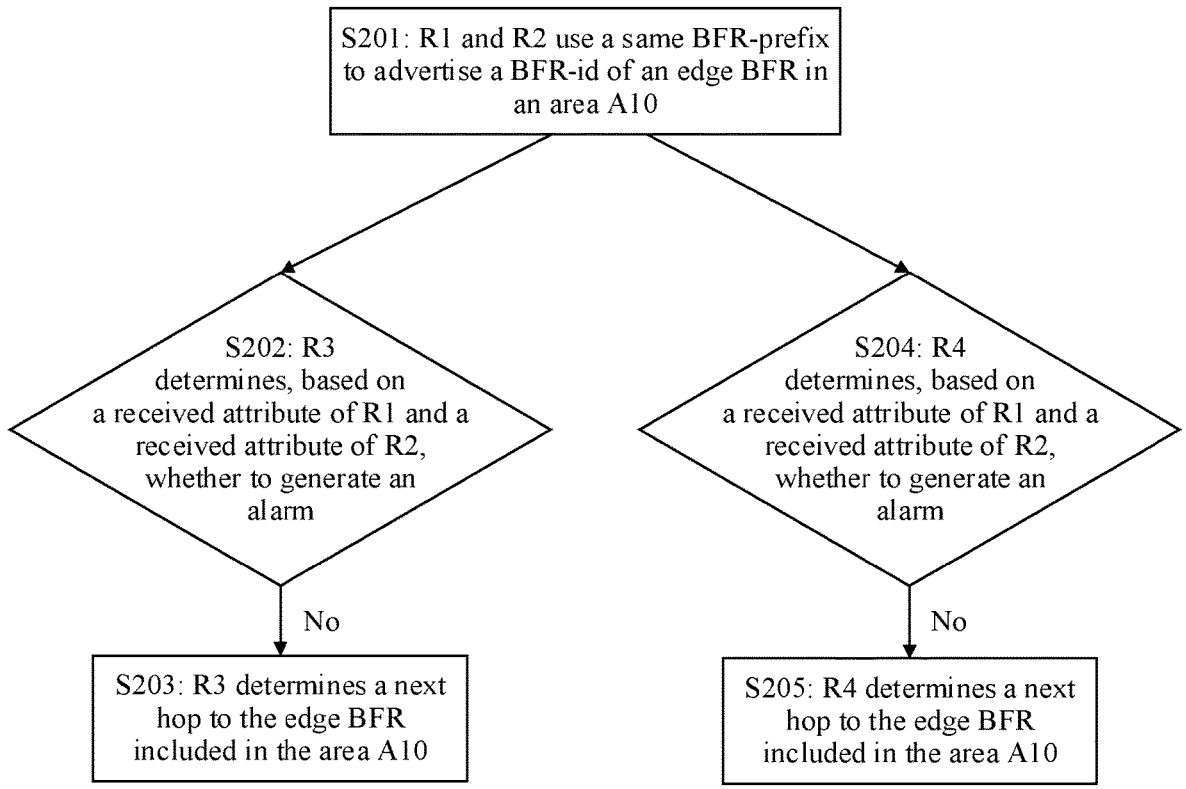
FIG. 2 is a schematic flowchart of a next hop determining method according to Embodiment 1.

FIG. 2 is a schematic flowchart of a next hop determining method according to Embodiment 1. In the method shown in FIG. 2, both R3 and R4 in FIG. 1 receive an attribute from R1, an attribute of R2, and BIER information sent by R1 and R2, and R3 or R4 determines a next hop based on the attribute of R1, the attribute of R2, and the BIER information advertised by R1 and R2. The attribute of R1 and the attribute of R2 are of a same type, but values thereof can be the same or different. R3 or R4 uses BIER information sent by the next hop to generate an entry used to forward a BIER packet. The entry used to forward the BIER packet may be one or more entries in a BIFT entry and a BIRT entry. Embodiment 1 is described by using an example in which BFR-prefixes of R1 and R2 are the same. With reference to FIG. 1 and FIG. 2, the following describes the next hop determining method according to Embodiment 1.

S201: R1 and R2 use a same BFR-prefix to advertise the BFR-id of the edge BFR in the area A10.

To prevent BIER forwarding from being looped, when neither device of R1 and R2 functions as a BFER, or neither device is configured with a valid BFR-id, or neither device is configured with a non-zero BFR-id, a same BFR-prefix may be configured for R1 and R2. The edge BFRs in the area A10 shown in FIG. 1 include R11, R12, and R13. The same BFR-prefix in this embodiment may be represented by an address prefix. The BFR-prefix may be an IPV4 address or an IPV6 address disclosed in RFC8401 or RFC8444, or the BFR-prefix may be an IPV6 address block. The IPV6 address block may be an address block with a 64-bit mask. The BIER information advertised by R1 and R2 to R3 in the area A1 through an IGP includes BFR-ids whose values are 11, 12, and 13. R1 and R2 further advertise attributes of R1 and R2 to R3 in the area A1 through the IGP. The attribute of R1 and the attribute of R2 include a first identifier. The first identifier is used to identify an anycast BFR-prefix. In this embodiment, the BIER information advertised by R1 may be first BIER information, and the BIER information advertised by R2 may be second BIER information. The BFR-ids included in the first BIER information or the second BIER information may be sent in a manner mentioned in RFC8401 or RFC8444, or may be carried in a BFR-id range of the draft-ietf-bier-prefix-redistribute-00 for sending. The BFR-prefixes of R1 and R2 can be carried in an adv-bfr-prefix field for sending. The first identifier included in the attributes of R1 and R2 may be carried and sent by using an adv-anycast-flag field. In a possible implementation, the attribute of R1 may further include one or more of a node identifier of R1 and a second identifier used to identify a priority. The attribute of R2 may further include one or more of a node identifier of R2 and a third identifier used to identify a priority. The node identifier in this embodiment is a system identifier (system-id) in an Intermediate System to Intermediate System (ISIS) protocol, and is a route identifier (router-id) in Open Shortest Path First (OSPF). The foregoing node identifier may be carried in an adv-router-id field for sending. The second identifier and the third identifier may be carried in an adv-admin-tag field for sending.

S202: R3 determines, based on the received attribute of R1 and the received attribute of R2, whether to generate an alarm, and performs S203 if R3 does not generate an alarm.

For example, based on the scenario in FIG. 1, R3 receives the attribute from R1, the attribute from R2, the first BIER information from R1, and the second BIER information from R2. The second BIER information received by R3 from R2 may come from one or more of an interface for communication between R3 and R1 and an interface for communication between R3 and R4. R3 determines that both R1 and R2 may serve as transit BFRs to the edge BFR included in the area A10 based on the first BIER information and the second BIER information. R3 may determine whether the attribute of R1 and the attribute of R2 include the first identifier. If neither the attribute of R1 nor the attribute of R2 includes the first identifier, R3 determines that configuration is incorrect, and outputs the alarm. If at least one of the attribute of R1 and the attribute of R2 includes the first identifier, R3 may determine that configuration is correct, and performs S203. A manner of outputting the alarm may be outputting the alarm to a network management device or another management device through a Network Configuration Protocol (NETCONF).

S203: R3 determines a next hop to the edge BFR included in the area A10.

In a possible implementation, when the attribute of R1 or the attribute of R2 includes the first identifier, R3 determines that the next hop is a device corresponding to the attribute carrying the first identifier. For example, if the attribute advertised by R1 includes the first identifier, but the attribute advertised by R2 does not include the first identifier, R3 sets the next hop to the edge BFR in the area A10 as R1, the next hop included in a BIRT entry or a BIFT entry that is obtained by R3 and that corresponds to the edge BFR in the area A10 is R1, and an outbound interface is an interface for communication between R3 and R1. If the attribute advertised by R2 includes the first identifier, but the attribute advertised by R1 does not include the first identifier, R3 sets the next hop device to the edge BFR in the area A10 as R2, the next hop included in a BIRT entry or a BIFT entry that is obtained by R3 and that corresponds to the edge BFR in the area A10 is R2, and an outbound interface is an interface that is on R3 and that can communicate with R2. In the scenario shown in FIG. 1, the interface that is on R3 and that can communicate with R2 includes an interface for communication between R3 and R1 and an interface for communication between R3 and R4. For details, refer to content in S202. When determining the interface that can communicate with R2, R3 may select the interface that can communicate with R2 based on a link cost or a link status. The BIRT entry and the BIFT entry may use the following examples.

The BIRT entry may be represented in the following manners:

(BFR-id=11, NextHop=R4)
(BFR-id=12, NextHop=R4)
(BFR-id=13, NextHop=R4)

The BIFT entry may be represented in the following manners:

(BFR-id=11, NextHop=R4, FBM=01110000)
(BFR-id=12, NextHop=R4, FBM=01110000)
(BFR-id=13, NextHop=R4, FBM=01110000)

In another possible implementation, when both the attribute of R1 and the attribute of R2 include the first identifier, R3 may determine the next hop in the following manners:

Manner 1: The attribute of R1 includes the node identifier of R1, and the attribute of R2 includes the node identifier of R2. When the node identifier of R1 is different from the node identifier of R2, R3 may determine, from R1 and R2, a device as the next-hop according to a first policy and based on the node identifier of R1, and the node identifier of R2. The first policy may be that a device with a large node identifier serves as the next hop, or a device with a small node identifier serves as the next hop.

Manner 2: The attribute of R1 includes the node identifier of R1 and the second identifier, and the attribute of R2 includes the node identifier of R2 and the third identifier. When the node identifier of R1 is the same as the node identifier of R2, R3 may determine, from R1 and R2, a device as the next-hop according to a second policy and based on the second identifier and the third identifier. The second policy may be that a device with a high priority in the second identifier and the third identifier serves as the next hop. Alternatively, the second policy may be that a device with a low priority in the second identifier and the third identifier serves as the next hop.

Manner 3: The attribute of R1 includes the second identifier, the attribute of R2 includes the third identifier, a priority identified by the second identifier is different from a priority identified by the third identifier, and R3 may determine, from R1 and R2, a device as the next hop according to the second policy and based on the second identifier and the third identifier.

Manner 4: The attribute of R1 includes the node identifier of R1 and the second identifier, and the attribute of R2 includes the node identifier of R2 and the third identifier. When the priority identified by the second identifier is the same as the priority identified by the third identifier, R3 may determine, from R1 and R2, a device as the next hop according to the first policy and based on the node identifier of R1 and the node identifier of R2. The first policy may be that a device with a large node identifier serves as the next hop, or a device with a small node identifier serves as the next hop.

Manner 5: The attribute of R1 includes the node identifier of R1 and the second identifier, and the attribute of R2 includes the node identifier of R2 and the third identifier. When the node identifier of R1 is the same as the node identifier of R2, and the priority identified by the second identifier is the same as the priority identified by the third identifier, R3 may select any device from R1 and R2 as the next hop.

Optionally, after determining the next hop, R3 may obtain an entry used to forward a BIER packet. A next hop included in the entry used to forward the BIER packet is the next hop determined by R3.

S204: R4 determines, based on the received attribute of R1 and the received attribute of R2, whether to generate an alarm, and performs S205 if R4 does not generate an alarm.

For example, based on the scenario in FIG. 1, R4 receives the attribute from R1, the attribute from R2, the first BIER information from R1, and the second BIER information from R2. R4 determines that both R1 and R2 may serve as transit BFRs to the edge BFR included in the area A10 based on the first BIER information and the second BIER information. R4 may determine whether the attribute of R1 and the attribute of R2 includes the first identifier. If neither the attribute of R1 nor the attribute of R2 includes the first identifier, R4 determines that configuration is incorrect, and outputs the alarm. If at least one of the attribute of R1 and the attribute of R2 includes the first identifier, R4 may determine that configuration is correct, and performs S205. For a manner of outputting the alarm, refer to the manner used by R3.

S205: R4 determines a next hop to the edge BFR included in the area A10.

In a possible implementation, when the attribute of R1 or the attribute of R2 includes the first identifier, R4 determines the next hop as a device corresponding to the attribute carrying the first identifier. For example, if the attribute of R1 that is advertised by R1 includes the first identifier, but the attribute of R2 that is advertised by R2 does not include the first identifier, R4 sets the next hop to the edge BFR in the area A10 as R1, the next hop included in a BIRT entry or a BIFT entry that is obtained by R4 and that corresponds to the edge BFR in the area A10 is R1, and an outbound interface is an interface for communication between R4 and R1. If the attribute of R2 that is advertised by R2 includes the first identifier, but the attribute of R1 that is advertised by R1 does not include the first identifier, R4 sets the next hop device to the edge BFR in the area A10 as R2, the next hop included in a BIRT entry or a BIFT entry that is obtained by R4 and that corresponds to the edge BFR of the area A10 is R2, and an outbound interface is an interface for communication between R4 and R2. For a method for determining the next hop by R4, refer to any one of Manner 1 to Manner 5 used by R3 to determine the next hop in S203.

Optionally, after determining the next hop, R4 may obtain an entry used to forward a BIER packet. A next hop included in the entry used to forward the BIER packet is the next hop determined by R4.

In the method provided in this embodiment, when sending a BEIR multicast packet to the area A10, R3 or R4 may send the multicast packet to the next hop by using the foregoing obtained entry used to forward the BIER packet. A method for determining the next hop to the edge BFR in the area A10 is flexible, and an alarm can be output when configuration is incorrect. When a priority comparison method is used, a priority of a device with better performance may be set according to the second policy, so that a node with better performance can be determined as the next hop. When a node identifier comparison method is used, a node identifier of a device with better performance may be set according to the first policy, so that a node with better performance can be determined as the next hop. In this way, according to the method provided in this embodiment, a performance requirement of a multicast service can be further met based on a next hop with better performance, so that forwarding efficiency is improved.

Embodiment 2

Figure 3:
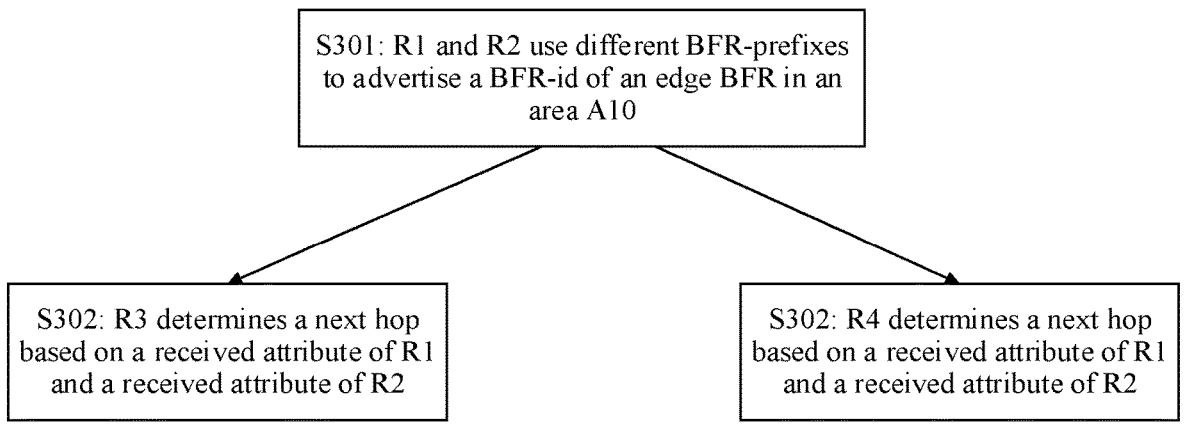
FIG. 3 is a schematic flowchart of a next hop determining method according to Embodiment 2.

FIG. 3 is a schematic flowchart of a next hop determining method according to Embodiment 2. In the method shown in FIG. 3, both R3 and R4 in FIG. 1 receive the attribute from R1, the attribute from R2, and the BIER information sent by R1 and R2, and R3 or R4 determines a next hop based on the attribute of R1 and the attribute of R2. R3 or R4 uses BIER information sent by the next hop to generate an entry used to forward a BIER packet. The entry used to forward the BIER packet may be one or more entries in a BIFT entry and a BIRT entry. Embodiment 2 is described by using an example in which BFR-prefixes of R1 and R2 are different. With reference to FIG. 1 and FIG. 3, the following describes the next hop determining method according to Embodiment 2.

S301: R1 and R2 use the different BFR-prefixes to advertise the BFR-id of the edge BFR in the area A10.

For example, different BFR-prefixes may be configured for R1 and R2, the BFR-prefix configured for R1 may be a first address, and the BFR-prefix configured for R2 may be a second address. A meaning of the BFR-prefix in Embodiment 2 is the same as that in Embodiment 1, and details are not described herein again. The edge BFRs in the area A10 shown in FIG. 1 include R11, R12, and R13. The first BIER information advertised by R1 to R3 in the area A1 through the IGP includes BFR-ids whose values are 11, 12, and 13. The attribute of R1 that is advertised by R1 to R3 in the area A1 through the IGP includes the first address. The second BIER information advertised by R2 to R3 in the area A1 through the IGP includes BFR-ids whose values are 11, 12, and 13. The attribute of R2 that is advertised by R2 to R3 in the area A1 through the IGP includes the second address. The BFR-ids included in the first BIER information or the second BIER information may be advertised in a manner disclosed in RFC8401 or RFC8444, or may be carried in a BFR-id range of the draft-ietf-bier-prefix-redistribute-00 for sending. The BFR-prefixes of can be carried in an adv-bfr-prefix field for sending.

In a possible implementation, the attribute of R1 may further include one or more of a node identifier of R1 and a second identifier used to identify a priority. The attribute of R2 may further include one or more of a node identifier of R2 and a third identifier used to identify a priority. For the meaning of the node identifier in Embodiment 2, refer to the corresponding content in Embodiment 1. Details are not described herein again. For the meaning of the identifier used to identify a priority in Embodiment 2, refer to the corresponding content in Embodiment 1. Details are not described herein again. The foregoing node identifier may be carried in an adv-router-id field for sending. The second identifier and the third identifier may be carried in an adv-admin-tag field for sending.

S302: R3 determines a next hop based on the received attribute of R1 and the received attribute of R2.

For example, based on the scenario in FIG. 1, R3 receives the attribute from R1, the attribute from R2, the first BIER information from R1, and the second BIER information from R2. The second BIER information received by R3 from R2 may come from one interface or a plurality of interfaces of an interface for communication between R3 and R1 and an interface for communication between R3 and R4. R3 determines, based on the first BIER information and the second BIER information, that transit BFRs that are passed through and that are to the edge BFR included in the area A10 include R1 and R2. R3 may determine the next hop based on the attribute of R1 and the attribute of R2. Optionally, after determining the next hop, R3 writes the next hop into a BIRT entry or a BIFT entry corresponding to the edge BFR in the area A10. When R3 determines that the next hop is R2, R3 may use the method in Embodiment 1 to determine an interface that can communicate with R2, and details are not described herein again.

R3 may use any one of the following manners or a combination of the following manners to determine, from R1 and R2, a device as the next hop, which is specifically as follows:

Manner 1: The attribute of R1 includes a node identifier of R1, and the attribute of R2 includes a node identifier of R2. When the node identifier of R1 is different from the node identifier of R2, R3 may determine, from R1 and R2, a device as the next-hop according to a first policy and based on the node identifier of R1, and the node identifier of R2. The first policy may be that a device with a large node identifier serves as a next hop, or a device with a small node identifier serves as a next hop.

Manner 2: The attribute of R1 includes the node identifier of R1 and the second identifier, and the attribute of R2 includes the node identifier of R2 and the third identifier. When the node identifier of R1 is the same as the node identifier of R2, R3 may determine, from R1 and R2, a device as the next-hop according to a second policy and based on the second identifier and the third identifier. The second policy may be that a device with a high priority in the second identifier and the third identifier serves as the next hop. Alternatively, the second policy may be that a device with a low priority in the second identifier and the third identifier serves as the next hop.

Manner 3: The attribute of R1 includes the second identifier, the attribute of R2 includes the third identifier, a priority identified by the second identifier is different from a priority identified by the third identifier, and R3 may determine, from the R1 and R2, a device as the next hop according to the second policy and based on the second identifier and the third identifier.

Manner 4: The attribute of R1 includes the node identifier of R1 and the second identifier, and the attribute of R2 includes the node identifier of R2 and the third identifier. When the priority identified by the second identifier is the same as the priority identified by the third identifier, R3 may determine, from R1 and R2, a device as the next hop according to the first policy and based on the node identifier of R1 and the node identifier of R2.

Manner 5: The attribute of R1 includes the node identifier of R1 and the second identifier, and the attribute of R2 includes the node identifier of R2 and the third identifier. When the node identifier of R1 is the same as the node identifier of R2, and the priority identified by the second identifier is the same as the priority identified by the third identifier, R3 may determine any device from R1 and R2 as the next hop.

Manner 6: The attribute of R1 includes a cost value from R1 to R3, and the attribute of R2 includes a cost value from R2 to R3. R3 may determine, from R1 and R2, a device as the next hop according to a fourth policy and based on the cost value from R1 to R3, and the cost value from R2 to R3. The cost value of the route from R2 to R3 and the cost value of the route from R1 to R3 may be different. The fourth policy is to select a device with a small cost value as the next hop, or select a device with a large cost value as the next hop. When the cost value from R3 to R1 is the same as the cost value from R3 to R2, the next hop may be determined by using one or a combination of Manners 1 to 5. For Manner 6, when the cost value from R1 to R3 is different from the cost value from R2 to R3, the first BIER information may not need to carry the second identifier, and the second BIER information may not need to carry the third identifier. When the cost value from R1 to R3 is different from the cost value from R2 to R3, even if the attribute of R1 includes the node identifier of R1 and the attribute of R2 includes the node identifier of R2, R3 may not identify and compare the node identifiers, which can reduce a performance requirement on R3 and improve entry obtaining efficiency.

Manner 7: The attribute of R1 includes a BFR-prefix of R1, the attribute of R2 includes a BFR-prefix of R2, and R3 may determine, from R1 and R2, a device as the next hop according to a fifth policy and based on the BFR-prefix of R1, and the BFR-prefix of R2. The fifth policy is to select a device with a smaller BFR-prefix as the next hop, or select a device with a larger BFR-prefix as the next hop. For Manner 7, the attribute of R1 may not need to carry the second identifier, and the attribute of R2 may not need to carry the third identifier. Even if the attribute of R1 includes the node identifier of R1, and the attribute of R2 includes the node identifier of R2, R3 may not identify and compare the node identifiers.

For example, when R3 cannot determine the next hop in Manner 6, R3 may determine the next hop in Manner 7. Alternatively, when R3 cannot determine the next hop in Manner 6, R3 may determine the next hop in Manner 1. Alternatively, when R3 cannot determine the next hop in Manner 6 and Manner 1, R3 may determine the next hop in Manner 2. Alternatively, when R3 cannot determine the next hop in Manner 6, Manner 1, and Manner 2, R3 may determine the next hop in Manner 7 or Manner 5. Alternatively, when R3 cannot determine the next hop in Manner 6, R3 may determine the next hop in Manner 3. Alternatively, when R3 cannot determine the next hop in Manner 6 and Manner 3, R3 may determine the next hop in Manner 4. Alternatively, when R3 cannot determine the next hop in Manner 6, Manner 3, and Manner 4, R3 may determine the next hop in Manner 7 or Manner 5. The foregoing describes a combination of the foregoing manners by using an example, and another combination may be further performed based on the foregoing plurality of manners. This is not limited in this embodiment.

S302: R4 determines a next hop based on the received attribute of R1 and the received attribute of R2.

For example, based on the scenario in FIG. 1, R4 receives the first BIER information from R1 and the second BIER information from R2, and R4 further receives the attribute of R1 and the attribute of R2. R4 determines, based on the first BIER information and the second BIER information, that transit BFRs that are passed through and that are to the edge BFR included in the area A10 include R1 and R2. R4 may determine the next hop by using a method the same as that used by R3, and details are not described herein again. Optionally, after determining the next hop, R4 writes the next hop into a BIRT entry or a BIFT entry corresponding to the edge BFR in the area A10.

In the method provided in this embodiment, when sending a multicast packet to the area A10, R3 or R4 may send the multicast packet to the next hop by using the foregoing obtained entry used to forward the BIER packet. A method for determining the next hop to the edge BFR in the area A10 is flexible, and an alarm can be output when configuration is incorrect. When a priority comparison method is used, a priority of a device with better performance may be set according to the second policy, so that a node with better performance can be determined as the next hop. When a node identifier comparison method is used, a node identifier of a device with better performance may be set according to the first policy, so that a node with better performance can be determined as the next hop. In this way, according to the method provided in this embodiment, a performance requirement of a multicast service can be further met based on a next hop with better performance, so that forwarding efficiency is improved.

Embodiment 3

In Embodiment 3, after adv-admin-tag is configured, a BIRT and a BIFT of a BFR-id are determined based on adv-admin-tag in a plurality of messages. With reference to the scenario shown in FIG. 1, the following describes a configuration and processing method of a related device:

1. Perform the Following Configuration on R1:

```
# Interfaces 1_to_2, 1_to_3, and 1_to_4 run in an isis process 1;
isis 1
   interface 1_to_3
   interface 1_to_2
   interface 1_to_4
interface loopback 1 2001:1:1:1::10/128
# Interfaces 1_to_11, and 1_to_21 run in an isis process 2;
isis 2
   interface 1_to_11
   interface 1_to_21
   interface loopback 2 2001:1:1:1::20/128
# BIER configuration
bier
--sub-domain 1
----BFR-id 1
----bfr-prefix interface loopback 1 [advertise-policy ply_1]
----bfr-prefix interface loopback 2 [advertise-policy ply_2]
Define a BFR-id range and policy to be advertised to the isis process 1;
advertise-policy ply_1
--import BFR-id-range 11 to 13
--import BFR-id-range 21 to 23
Define a BFR-id range and policy to be advertised to the isis process 2;
advertise-policy ply_2
--import BFR-id-range 3 to 5
```

Figure 4:
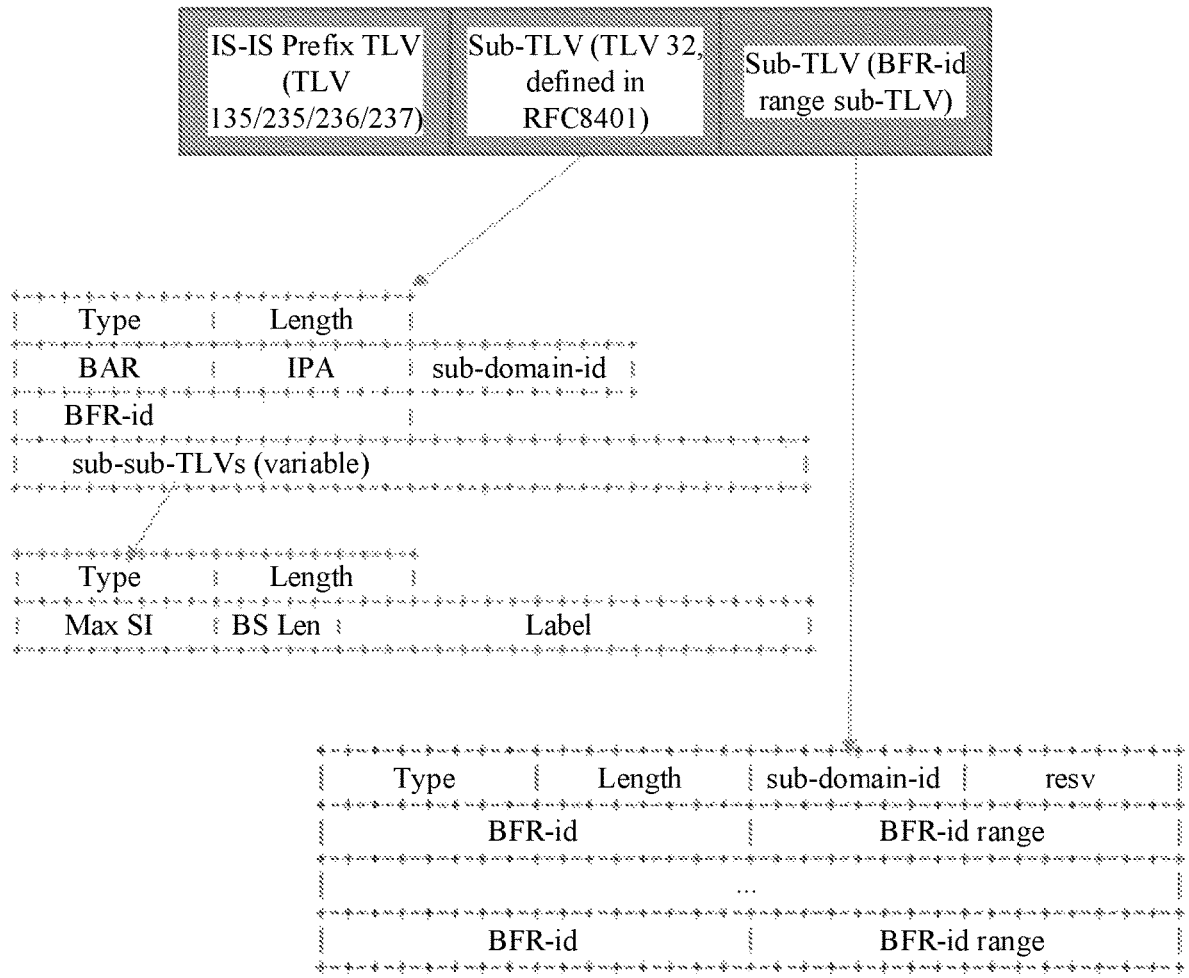
FIG. 4 shows a packet format according to Embodiment 3.

For example, R1 advertises the first BIER information with BFR-ids 11, 12, 13, 21, 22, and 23 to the ISIS 1 process (corresponding to the area A1) by using a BFR-id range sub-TLV. R1 further advertises information about the local node whose BFR-id is 1 to the ISIS 1 process by using a BIER-info sub-TLV defined in RFC8401. The preceding information advertised by R1 to ISIS 1 process uses an IP address 2001:1:1:1::10 of loopback 1 as a BFR-prefix. FIG. 4 shows an example in which an ISIS message sent by R1 carries a BFR-id range sub-TLV, and both sub-TLVs exists as a sub-TLV of an ISIS Prefix TLV (a TLV type one of 135, 235, 236, and 237), where the BFR-id range sub-TLV may be a BIER proxy range sub-TLV defined in draft-ietf-bier-prefix-redistribute-00.

A packet format shown in FIG. 4 may be another example in which an ISIS message sent by R1 carries a BFR-id range sub-TLV, where the BFR-id range sub-TLV exists as a sub-TLV of an ISIS Prefix TLV (a TLV type is one of 135, 235, 236, and 237). A BFR-id range sub-TLV in a message advertised by the router R1 includes a BFR-id range of 11, 12, 13, 21, 22, and 23, where the BFR-id range sub-TLV may be obtained by modifying a BIER proxy range sub-TLV defined in draft-ietf-bier-prefix-redistribute-00. Similarly, R1 advertises information with BFR-ids being 3, 4, or 5 to the ISIS 2 process (corresponding to the areas A10 and A20) by using a BFR-id range sub-TLV. R1 further advertises information about the local node with BFR-id=1 to the ISIS 2 process by using a BIER-info sub-TLV defined in RFC8401. The preceding information advertised by R1 to the ISIS 2 process uses an IP address 2001:1:1:1::20 of loopback 2 as a BFR-prefix.

2. Perform the Following Configuration on R2:

```
# Interfaces 2_to_4, and 2_to_1 run in an isis process 1;
isis 1
   interface 2_to_4
   interface 2_to_1
   interface loopback 1 2001:2:2:2::10/128
# Interfaces 1_to_13, and 1_to_23 run in an isis process 2;
isis 2
   interface 2_to_13
   interface 2_to_23
   interface loopback 2 2001:2:2:2::20/128
# BIER configuration;
bier
--sub-domain 1
----BFR-id 1
----bfr-prefix interface loopback 1 [advertise-policy ply_1]
----bfr-prefix interface loopback 2 [advertise-policy ply_2]
Define a BFR-id range and policy to be advertised to the isis process 1;
advertise-policy ply_1
--import BFR-id-range 11 to 13
--import BFR-id-range 21 to 23
Define a BFR-id range and policy to be advertised to the isis process 2;
advertise-policy ply_2
--import BFR-id-range 3 to 5
```

For example, R2 advertises BFR-ids 11, 12, 13, 21, 22, and 23 to the ISIS 1 process (corresponding to the area A1) by using a BFR-id range sub-TLV. R2 further advertises BFR-id=2 information of the local node to the ISIS 1 process by using a BIER-info sub-TLV defined in RFC8401. The preceding information advertised by R2 to the ISIS 1 process uses an IP address 2001:2:2:2::10 of loopback 1 as a BFR-prefix. Similarly, R2 advertises information with BFR-ids being 3, 4, and 5 to the ISIS 2 process (corresponding to the areas A10 and A20) by using a BFR-id range sub-TLV. R2 further advertises information about the local node with BFR-id=2 to the ISIS 2 process by using a BIER-info sub-TLV defined in RFC8401. The preceding information advertised by R2 to the ISIS 2 process uses an IP address 2001:2:2:2::20 of loopback 2 as a BFR-prefix. A packet format used by R2 may be the packet format shown in FIG. 4, and details are not described herein again.

3. For a method of establishing, by a router in an area A1, next hops to the BFR-ids 11, 12, 13, 21, 22, and 23, refer to the method in Embodiment 1 or Embodiment 2. Details are not described herein again.

Embodiment 4

Embodiment 4 describes that a next hop included in a BIRT and a BIFT of a BFR-id is determined by configuring adv-admin-tag and based on adv-admin-tag in a plurality of messages. The following describes the configuration in Embodiment 4 with reference to the scenario shown in FIG. 1.

1. Perform the Following Configuration on R1:

```
# Interfaces 1_to_2, 1_to_3, and 1_to_4 run in an isis process 1;
isis 1
   interface 1_to_3
   interface 1_to_2
   interface 1_to_4
   interface loopback 1 2001:1:1:1::10/128
# Interfaces 1_to_11, and 1_to_21 run in an isis process 2;
isis 2
   interface 1_to_11
   interface 1_to_21
   interface loopback 2 2001:1:1:1::20/128
# BIER configuration
bier
--sub-domain 1
----BFR-id 1
----bfr-prefix interface loopback 1 [advertise-policy ply_1]
----bfr-prefix interface loopback 2 [advertise-policy ply_2]
Define a BFR-id range and policy to be advertised to the isis process 1;
advertise-policy ply_1
--apply administrative-tag 1
--import BFR-id-range 11 to 13
--import BFR-id-range 21 to 23
Define a BFR-id range and policy to be advertised to the isis process 2;
advertise-policy ply_2
--apply administrative-tag 1
--import BFR-id-range 3 to 5
```

Figure 5:
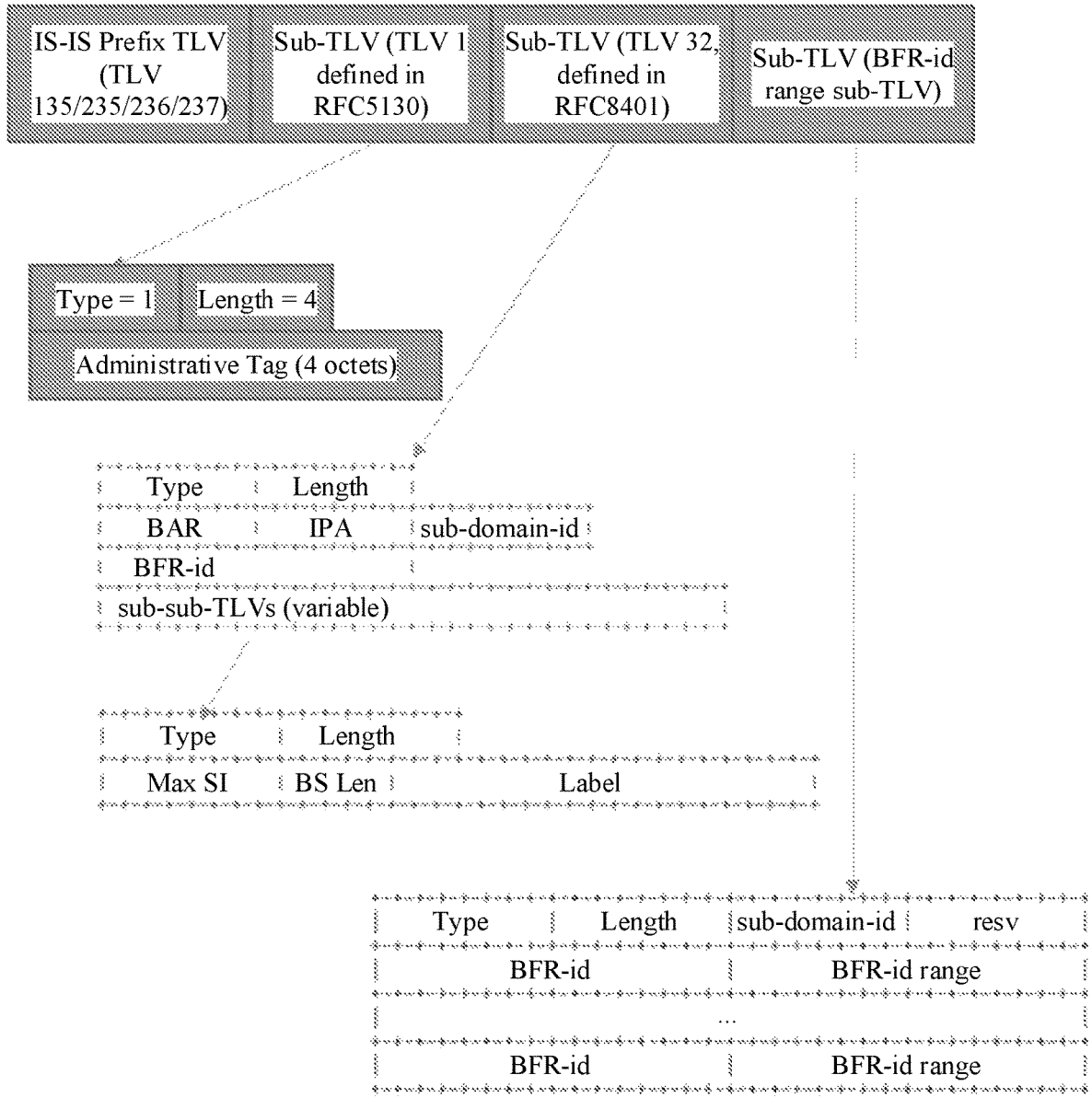
FIG. 5 shows a packet format according to Embodiment 4.

For example, R1 advertises BFR-ids 11, 12, 13, 21, 22, and 23 to the ISIS 1 process (corresponding to the area A1), and carries an administrative-tag whose value is 1 by using a BFR-id range sub-TLV. R1 further advertises BFR-id=1 information of the local node to the ISIS 1 process by using a BIER-info sub-TLV defined in RFC8401. The preceding information advertised by R1 to ISIS 1 process uses an IP address 2001:1:1:1::10 of loopback 1 as a BFR-prefix. FIG. 5 shows an example in which an ISIS message sent by R1 carries an administrative-tag and a BFR-id range sub-TLV. The foregoing parameters all exist as sub-TLVs of an ISIS Prefix TLV (a TLV type is one of 135, 235, 236, and 237). An administrative-tag value is used as a differentiation of a BFR-id included in a BFR-id Range sub-TLV. For example, in the BFR-id range sub-TLV in the message advertised by R1, BFR-ids are 11, 12, 13, 21, 22, and 23, and the administrative-tag value is 1. The BFR-id range sub-TLV may be obtained by modifying a BIER proxy range sub-TLV defined in draft-ietf-bier-prefix-redistribute-00.

Figure 6:
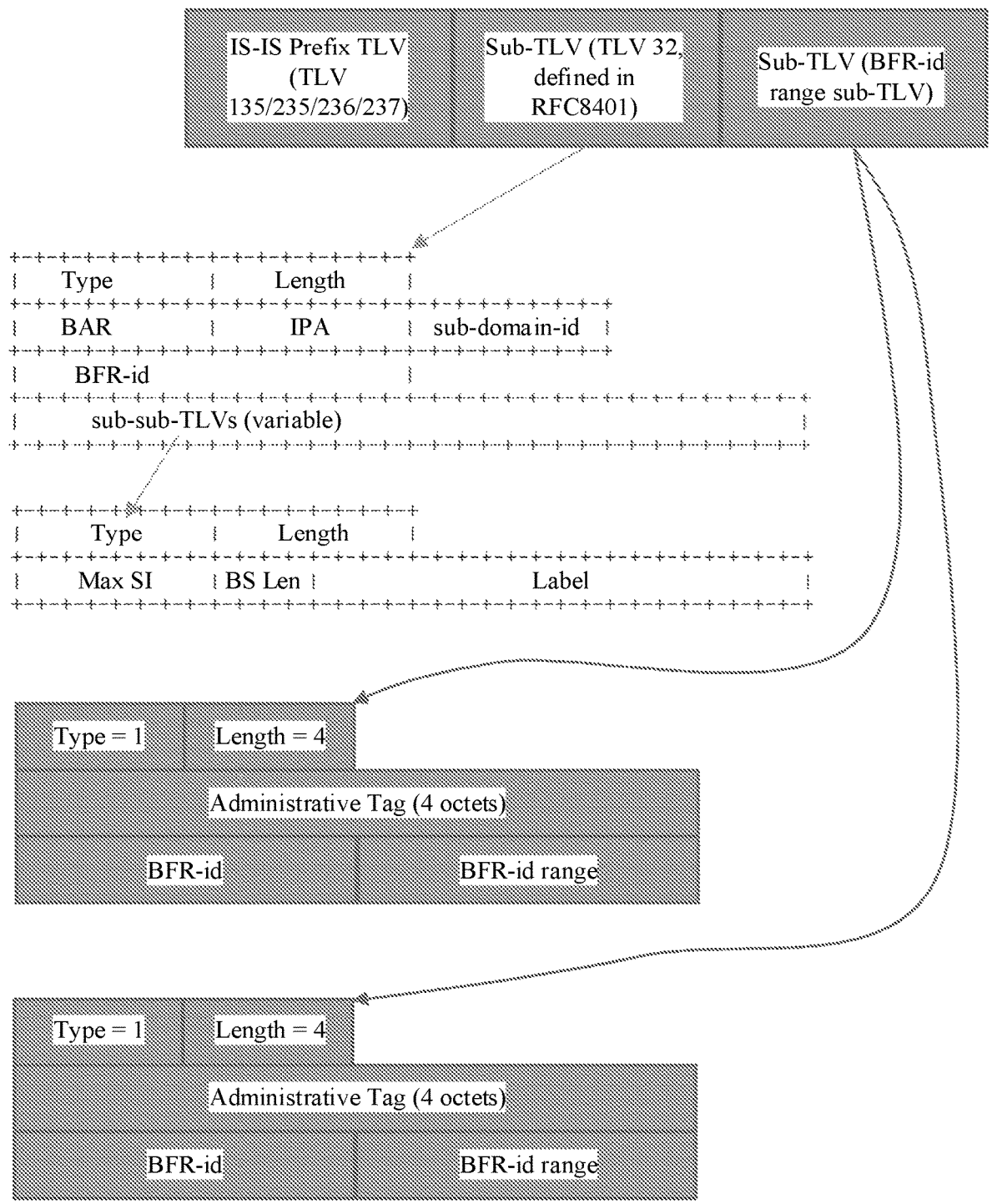
FIG. 6 shows another packet format according to Embodiment 4.

FIG. 6 shows another example in which an ISIS message sent by R1 carries an administrative-tag and a BFR-id range sub-TLV. The BFR-id range sub-TLV exists as a sub-TLV of an ISIS Prefix TLV (a TLV type is one of 135, 235, 236, and 237), and an administrative-tag value is defined in the BFR-id range sub-TLV. In the message advertised by R1, a BFR-id range included in the BFR-id range sub-TLV is 11, 12, 13, 21, 22, and 23, and the administrative-tag value is 1. One ISIS Prefix TLV includes two BFR-id range sub-TLVs. Each BFR-id range sub-TLV includes an administrative tag and an (BFR-id, BFR-id range) element group. The BFR-id range sub-TLV may be obtained by modifying a BIER proxy range sub-TLV defined in draft-ietf-bier-prefix-redistribute-00. Alternatively, one ISIS Prefix TLV may include one BFR-id range sub-TLV, and the BFR-id range sub-TLV includes one Administrative Tag and two (BFR-id, BFR-id range) element groups, as shown in FIG. 6.

Similarly, R1 advertises information with BFR-ids being 3, 4, or 5 to the ISIS 2 process (corresponding to the areas A10 and A20) and carries an administrative-tag whose value is 1 by using a BFR-id range sub-TLV. R1 further advertises BFR-id=1 information of the local node to the ISIS 2 process by using a BIER-info sub-TLV defined in RFC8401. The preceding information advertised by R1 to the ISIS 2 process uses an IP address 2001:1:1:1::20 of loopback 2 as a BFR-prefix.

2. Perform the Following Configuration on R2:

```
# Interfaces 2_to_4, and 2_to_1 run in an isis process 1;
isis 1
   interface 2_to_4
   interface 2_to_1
   interface loopback 1 2001:2:2:2::10/128
# Interfaces 1_to_13, and 1_to_23 run in an isis process 2;
isis 2
   interface 2_to_13
   interface 2_to_23
   interface loopback 2 2001:2:2:2::20/128
# BIER configuration;
bier
--sub-domain 1
----BFR-id 1
----bfr-prefix interface loopback 1 [advertise-policy ply_1]
----bfr-prefix interface loopback 2 [advertise-policy ply_2]
Define a BFR-id range and policy to be advertised to the isis process 1;
advertise-policy ply_1
--apply administrative-tag 2
--import BFR-id-range 11 to 13
--import BFR-id-range 21 to 23
Define a BFR-id range and policy to be advertised to the isis process 2;
advertise-policy ply_2
--apply administrative-tag 2
--import BFR-id-range 3 to 5
```

For example, R2 advertises BFR-ids 11, 12, 13, 21, 22, and 23 to the ISIS 1 process (corresponding to the area A1), and carries an administrative-tag whose value is 2 by using a BFR-id range sub-TLV. R2 further advertises BFR-id=2 information of the local node to the ISIS process 1 by using a BIER-info sub-TLV defined in RFC8401. The preceding information advertised by R2 to the ISIS process 1 uses an IP address 2001:2:2:2::10 of loopback 1 as a BFR-prefix. Similarly, R2 advertises information with BFR-ids being 3, 4, and 5 to the ISIS 2 process (corresponding to the areas A10 and A20) and carries an administrative-tag whose value is 2 by using a BFR-id range sub-TLV. R2 further advertises BFR-id=2 information of the local node to the ISIS process 2 by using a BIER-info sub-TLV defined in RFC8401. The preceding information advertised by R2 to the ISIS 2 process uses an IP address 2001:2:2:2::20 of loopback 2 as a BFR-prefix. R2 may alternatively publish the second BIER information and the attribute of R2 by using the packet format in FIG. 5 or FIG. 6. Details are not described herein again.

3. The Routers in the Area A1 Establish Next Hop Routes and Forwarding Information to BFR-Ids 11, 12, 13, 21, 22, and 23. For Details, Refer to Corresponding Content in Embodiment 1 or Embodiment 2, and Details are not Described Herein Again.

Embodiment 5

In Embodiment 5, a BIRT and a BIFT of a BFR-id are determined based on a route to a BFR-prefix by configuring the anycast BFR-prefix and configuring same BIER encapsulation related information. In this embodiment, neither R1 nor R2 is configured with a valid BFR-id value (the BFR-id value filled in a BIER info sub-TLV is an invalid value 0). With reference to the scenario shown in FIG. 1 the following describes a configuration method.

1. Perform the Following Configuration on R1:

```
# Interfaces 1_to_2, 1_to_3, and 1_to_4 run in an isis process 1;
isis 1
   interface 1_to_3
   interface 1_to_2
   interface 1_to_4
   interface loopback 1 2001:1:1:1::AAAA anycast
# Interfaces 1_to_11, and 1_to_21 run in an isis process 2;
isis 2
   interface 1_to_11
   interface 1_to_21
   interface loopback 2 2001:1:1:1::BBBB anycast
# BIER configuration
bier
--sub-domain 1
----end-bier sid 2001:1:1:1::AB37 anycast
----bift-id 200001 anycast
----bfr-prefix interface loopback 1 [advertise-policy ply_1]
----bfr-prefix interface loopback 2 [advertise-policy ply_2]
Define a BFR-id range and policy to be advertised to the isis process 1;
advertise-policy ply_1
--apply anycast-flag
--import BFR-id-range 11 to 13
--import BFR-id-range 21 to 23
Define a BFR-id range and policy to be advertised to the isis process 2;
advertise-policy ply_2
--apply anycast-flag
--import BFR-id-range 3 to 5
```

Meanings of Some Configurations are as Follows:

The Interface loopback 1 2001:1:1:1::AAAA anycast indicates that a configured IPV6 address is an anycast address, and is used as a BFR-prefix for advertising BIER information.

The Interface loopback 2 2001:1:1:1::BBBB anycast indicates that a configured IPV6 address is an anycast address, and is used as a BFR-prefix for advertising BIER information The end-bier sid 2001:1:1:1::AB37 anycast indicates that encapsulation information used for forwarding a BIER packet is anycast information. In this example, end-bier is BIER encapsulation information used for BIERv6 encapsulation.

The BIFT-ID 200001 anycast indicates that encapsulation information used for forwarding a BIER packet is anycast information. In this example, BIFT-ID is BIER packet encapsulation information used for BIERv6/BIER-MPLS encapsulation. When being used for BIER-MPLS encapsulation, the BIFT-ID value is an MPLS label. To support the anycast method in this solution, a same MPLS label needs to be manually configured for R1 and R2, that is, a same BIFT-ID value is configured. In non-MPLS encapsulation or BIERv6 encapsulation, the value of BIFT-ID can be automatically generated based on a sub-domain-id, a BitString-Length (BSL) ID and a set identifier (SI) of a BIER. Values generated on R1 and R2 according to a same rule are the same. Therefore, no additional configuration is required.

The apply anycast-flag indicates that an anycast flag is carried when BIER information is advertised.

Figure 7:
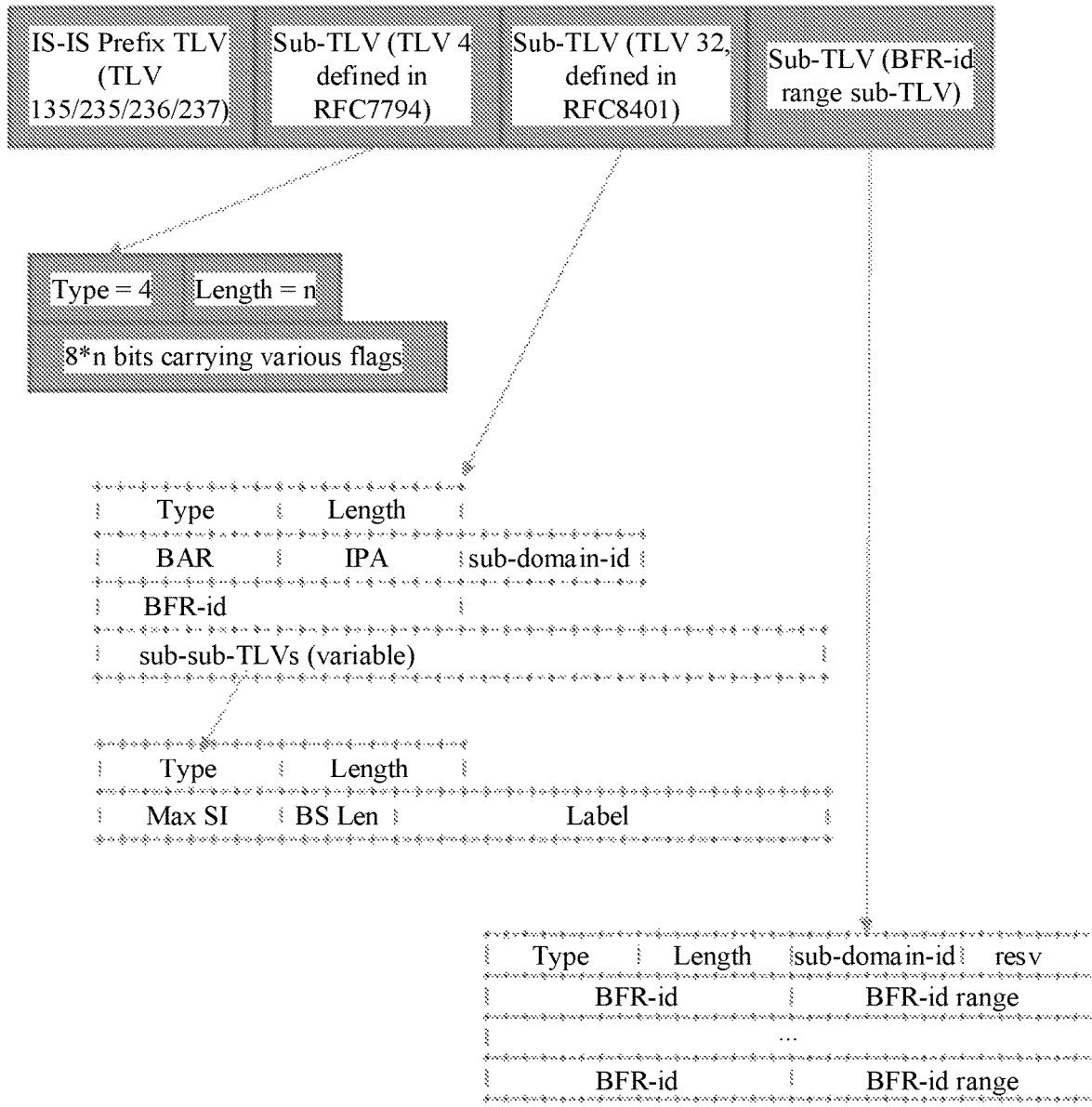
FIG. 7 shows a packet format according to Embodiment 5.

For example, R1 advertises BFR-ids 11, 12, 13, 21, 22, and 23 to the ISIS process 1 (corresponding to the area A1) and carries an anycast flag by using a BFR-id range sub-TLV. R1 also advertises BFR-id=0 information of the local node to the ISIS process 1 by using a BIER-info sub-TLV defined in RFC8401. The preceding information advertised by R1 to the ISIS process 1 uses the IP address 2001:1:1:1::AAAA of loopback 1 as the BFR-prefix. FIG. 7 shows an example in which an ISIS message sent by R1 carries an anycast flag and a BFR-id range sub-TLV, which all exist as sub-TLVs of an ISIS Prefix TLV (a TLV type is one of 135, 235, 236, and 237) as shown in FIG. 7. The anycast flag is carried in an anycast flag bit (the fourth bit in a sub-TLV flag bit field) defined by draft-ietf-lsr-isis-srv6-extensions-11 based on a Prefix Attribute Flags sub-TLV in RFC7794. The flag bit is used in this solution for advertising BIER information and correspondingly establishing BIER routes and BIER forwarding information.

2. Perform the Following Configuration on R2:

```
# Interfaces 1_to_2, 1_to_3, and 1_to_4 run in an isis process 1;
isis 1
   interface 2_to_4
   interface 2_to_1
   interface loopback 1 2001:1:1:1::AAAA anycast
# Interfaces 1_to_11, and 1_to_21 run in an isis process 2;
isis 2
   interface 2_to_13
   interface 2_to_23
   interface loopback 2 2001:1:1:1::BBBB anycast
# BIER configuration
bier
--sub-domain 1
----end-bier sid 2001:1:1:1::AB37 anycast
----bift-id 200001 anycast
----bfr-prefix interface loopback 1 [advertise-policy ply_1]
----bfr-prefix interface loopback 2 [advertise-policy ply_2]
Define a BFR-id range and policy to be advertised to the isis process 1;
advertise-policy ply_1
--apply anycast-flag
--import BFR-id-range 11 to 13
--import BFR-id-range 21 to 23
Define a BFR-id range and policy to be advertised to the isis process 2;
advertise-policy ply_2
--apply anycast-flag
--import BFR-id-range 3 to 5
```

Meanings of related configurations are similar to those of R1, and are not described.

Correspondingly, R2 advertises BFR-ids 11, 12, 13, 21, 22, and 23 to the ISIS process 1 (corresponding to the area A1) and carries an anycast flag by using a BFR-id range sub-TLV. R2 also advertises BFR-id=0 information of the local node to the ISIS process 1 by using a BIER-info sub-TLV defined in RFC8401. The preceding information advertised by R2 to the ISIS process 1 uses the IP address 2001:1:1:1::AAAA of loopback 1 as a BFR-prefix that is the same as the BFR-prefix used by R1. R3, R4, and R5 receive the information advertised by R1 and R2. For BFR-id=11, R1 and R2 use the same BFR-prefix and carry the anycast flag. Therefore, R3, R4, and R5 establish a forwarding table for BFR-id=11 as follows: A next hop of BFR-prefix=2001: 1:1:1:: AAAA is a next hop in a routing table and a forwarding table of BFR-id=11.

Figure 8:
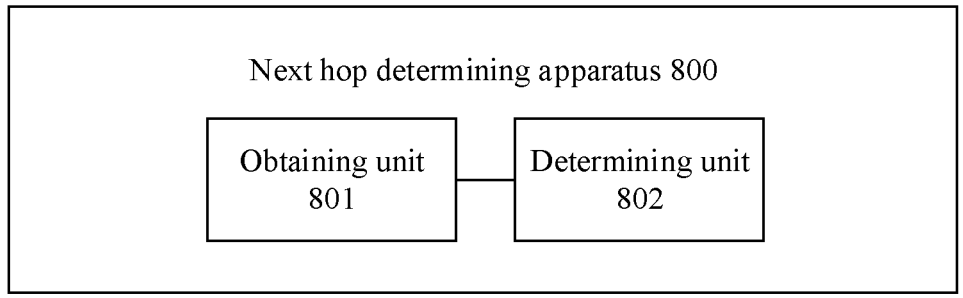
FIG. 8 is a schematic diagram of a structure of a next hop determining apparatus according to an embodiment.

FIG. 8 shows a next hop determining apparatus according to an embodiment. The apparatus 800 may be disposed at an edge BFR, such as R3, R4, or R5, except R1 and R2 in the area A1 in any one of Embodiment 1 to Embodiment 5. A first device mentioned in this embodiment may be R1 in any embodiment of Embodiment 1 to Embodiment 5, and a second device may be R2 in any embodiment of Embodiment 1 to Embodiment 5. The apparatus 800 is disposed in a BIER domain based on bit index forwarding routing, and includes an obtaining unit 801 and a determining unit 802.

For example, the obtaining unit 801 is configured to obtain first BIER information of the first device, an attribute of the first device, second BIER information of the second device, and an attribute of the second device, where the first BIER information includes a BFR-id of an edge BFR in a sub-domain, and the second BIER information includes the BFR-id of the edge BFR in the sub-domain. The determining unit 802 is configured to determine, based on the first BIER information, the second BIER information, the attribute of the first device, and the attribute of the second device, a next hop to the edge BFR in the sub-domain.

In a possible implementation, the attribute of the first device and the attribute of the second device include a first identifier, and the first identifier is used to identify an anycast BFR prefix; and the apparatus further includes an identifying unit. The identifying unit is configured to: when the first BIER information is the same as the second BIER information, and the attribute of the first device and the attribute of the second device include the first identifier, determine the next hop to the edge BFR in the sub-domain.

In a possible implementation, the attribute of the first device or the attribute of the second device includes a first identifier, and the first identifier is used to identify an anycast BFR prefix; and the determining unit 802 is further configured to: when the first BIER information is the same as the second BIER information, determine a device whose attribute includes the first identifier as the next hop.

In a possible implementation, the apparatus further includes an output unit. The output unit is configured to output an alarm when the first BFR information is the same as the second BIER information and neither the attribute of the first device nor the attribute of the second device includes a first identifier.

In a possible implementation, the attribute of the first device further includes a node identifier of the first device, the attribute of the second device includes a node identifier of the second device, and the determining unit 802 is further configured to: when the first BIER information is the same as the second BIER information, determine one of the first device and the second device as the next hop according to a first policy and based on the node identifier of the first device and the node identifier of the second device, where the first policy includes using a device with a large node identifier as the next hop or using a device with a small node identifier as the next hop.

In a possible implementation, the attribute of the first device further includes a second identifier, the attribute of the second device further includes a third identifier, the second identifier is used to identify a priority of the first device, the third identifier is used to identify a priority of the second device, and the determining unit 802 is further configured to: when the first BIER information is the same as the second BIER information, determine one of the first device and the second device as the next hop according to a second policy and based on the second identifier and the third identifier, where the second policy includes using a device with a high priority as the next hop or using a device with a low priority as the next hop.

In a possible implementation, the attribute of the first device includes a BFR prefix of the first device, the attribute of the second device includes a BFR prefix of the second device, the BFR prefix of the first device is different from the BFR prefix of the second device, and the determining unit 802 is further configured to: when the first BIER information is the same as the second BIER information, determine one of the first device and the second device as the next hop according to a third policy and based on a cost value of a first link and a cost value of a second link, where the third policy includes using a peer device of a link with a small cost value as the next hop or using a peer device of a link with a large cost value as the next hop, the first link is a link from the third device to the first device, and the second link is a link from the third device to the second device.

In a possible implementation, the attribute of the first device further includes a BFR prefix of the first device, the attribute of the second device includes a BFR prefix of the second device, the BFR prefix of the first device is different from the BFR prefix of the second device, and the determining unit 802 is further configured to: when the first BIER information is the same as the second BIER information, determine one of the first device and the second device as the next hop according to a fourth policy and based on the BFR prefix of the first device and the BFR prefix of the second device, where the fourth policy includes using a device with a small BFR prefix as the next hop or using a device with a large BFR prefix as the next hop.

In a possible implementation, the attribute of the first device includes a BFR prefix of the first device and a node identifier of the first device, the attribute of the second device includes a BFR prefix of the second device and a node identifier of the second device, the BFR prefix of the first device is different from the BFR prefix of the second device, and the determining unit 802 is further configured to: when the first BIER information is the same as the second BIER information, determine one of the first device and the second device as the next hop according to a first policy and based on the node identifier of the first device and the node identifier of the second node, where the first policy includes using a device with a large node identifier as the next hop or using a device with a small node identifier as the next hop.

In a possible implementation, the attribute of the first device includes a BFR prefix of the first device and a second identifier, the attribute of the second device includes a BFR prefix of the second device and a third identifier, the second identifier is used to identify a priority of the first device, the third identifier is used to identify a priority of the second device, the BFR prefix of the first device is different from the BFR prefix of the second device, and the determining unit 802 is further configured to: when the first BIER information is the same as the second BIER information, determine one of the first device and the second device as the next hop according to a second policy and based on the second identifier and the third identifier, where the second policy includes using a device with a high priority as the next hop or using a device with a low priority as the next hop.

Figure 9:
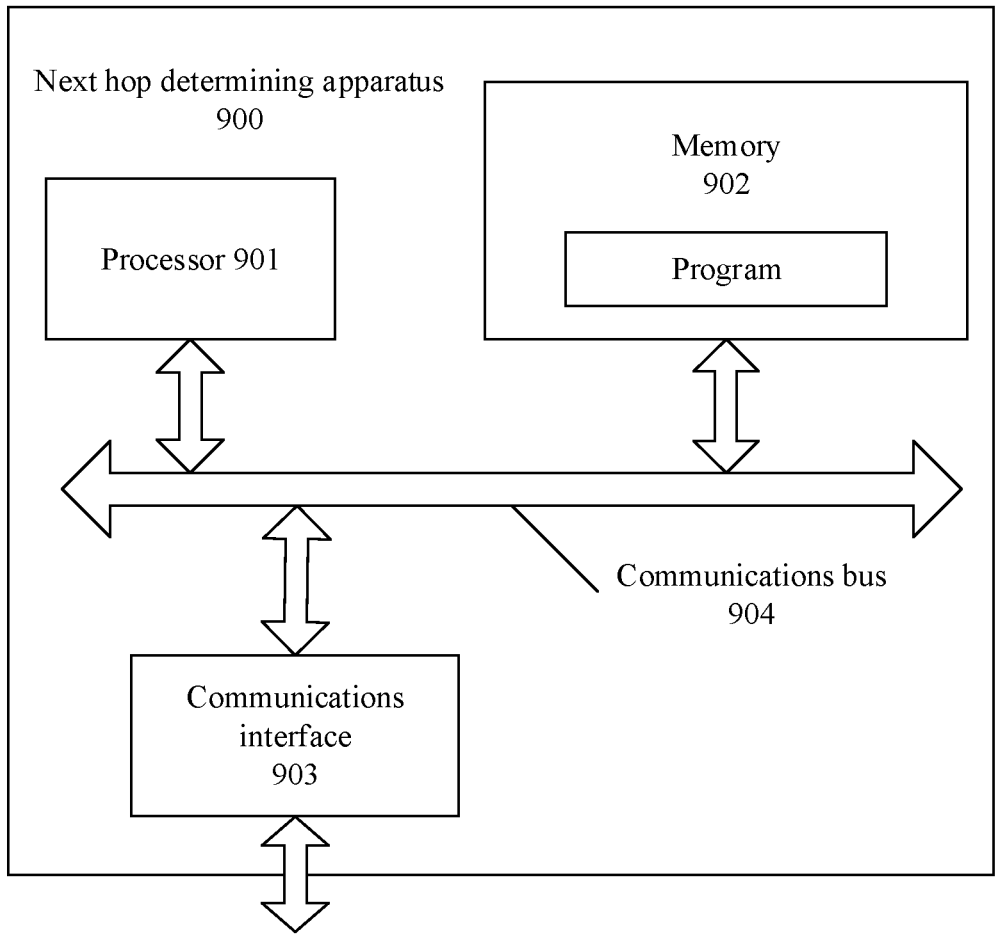
FIG. 9 is a schematic diagram of a structure of another next hop determining apparatus according to an embodiment.

FIG. 9 is a schematic diagram of a structure of a next hop determining apparatus according to an embodiment. The next hop determining apparatus 900 provided in the embodiment corresponding to FIG. 10 may be the next hop determining apparatus 800 provided in the embodiment corresponding to FIG. 8. The next hop determining apparatus 900 provided in the embodiment corresponding to FIG. 9 is described from a perspective of a hardware structure. The next hop determining apparatus 900 includes a processor 901, a memory 902, a communications bus 904, and a communications interface 903. The processor 901, the memory 902, and the communications interface 903 are connected through the communications bus 904. The memory 902 is configured to store a program. When the apparatus 900 is disposed in R3 or R4 mentioned in any one of Embodiment 1 to Embodiment 5, the processor 901 performs, according to an executable instruction included in the program read from the memory 902, the method performed in any one of Embodiment 1 to Embodiment 5 by using R3 or R4.

An embodiment provides a system. The system includes the next hop determining apparatus 800. The next hop determining apparatus 800 may be configured to perform the method performed by R3 or R4 mentioned in any one of Embodiment 1 to Embodiment 5.

An embodiment provides a chip. The chip may include the memory 902 and the processor 901 shown in FIG. 9. The memory 902 is configured to store computer instructions. The processor 901 is configured to: invoke the computer instructions from the memory 902 and run the computer instructions, to perform the method performed by R3 or R4 mentioned in any one of Embodiment 1 to Embodiment 5. The chip provided in this embodiment may be disposed on forwarding hardware, or a forwarding circuit included in the forwarding hardware is integrated into the chip provided in the embodiment.

In the specification, claims, and accompanying drawings, the terms "first", "second", "third", "fourth", and so on are intended to distinguish between similar objects but do not necessarily indicate a specific sequence or order. It should be understood that data termed in such a way are interchangeable in proper circumstances so that the embodiments described herein can be implemented in another order than the order illustrated or described herein. In addition, the terms "include", "have" and any other variants thereof are intended to cover non-exclusive inclusion. For example, a process, method, system, product, or device that includes a list of steps or units is not necessarily limited to those steps or units that are expressly listed, but may include other steps or units that are not expressly listed or inherent to the process, method, product, or device.

"At least one item (piece)" means one or more, and "a plurality of" means two or more. At least one of the following items (pieces) or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural. "A and/or B" includes only A, only B, and A and B.

It may be clearly understood by a person skilled in the art that, for the purpose of convenient and brief descriptions, for a detailed working process of the foregoing system, apparatus, and unit, refer to a corresponding process in the foregoing method embodiments, and details are not described herein.

In the several embodiments provided, it should be understood that the disclosed system, apparatuses, and methods may be implemented in another manner. For example, the described apparatus embodiment is only an example. For example, division into the units is only logical module division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be obtained based on actual requirements to achieve the objectives of the solutions of embodiments.

In addition, module units in embodiments may be integrated into one processing unit, each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments. The storage medium includes any medium that can store program code, such as a USB flash drive, a removable hard disk, a read-only memory (ROM), a random-access memory (RAM), a magnetic disk, or an optical disc.

A person skilled in the art should be aware that in the foregoing one or more examples, functions described in the present disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or a dedicated computer.

The objectives, technical solutions, and beneficial effects of the present disclosure are further described in detail in the foregoing specific implementations. It should be understood that the foregoing descriptions are merely specific implementations of the present disclosure.

The foregoing embodiments are merely intended for describing the technical solutions of this disclosure, rather than limiting this disclosure. Although this disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments.

What is claimed is:

1. A method implemented by a third device and comprising:
   obtaining first Bit Index Explicit Replication (BIER) information of a first device, a first attribute of the first device, second BIER information of a second device, and a second attribute of the second device, wherein the first BIER information and the second BIER comprise a bit forwarding router identifier (BFR-id) of an edge bit forwarding router (BFR) in a sub-domain; and
   determining, based on the first BIER information, the second BIER information, the first attribute, and the second attribute, a next hop to the edge BFR in the sub-domain.

2. The method of claim 1, further comprising further determining, when the first BIER information is the same as the second BIER information and when the first attribute and the second attribute comprise a first identifier identifying an atypical BFR prefix, the next top hop.

3. The method of claim 1, wherein the first attribute or the second attribute comprises a first identifier, identifying an anycast BFR prefix, and wherein determining the next hop comprises determining, when the first BIER information is the same as the second BIER information, the next hop is a device whose attribute comprises the first identifier.

4. The method of claim 1, further comprising outputting an alarm when the first BIER information is the same as the second BIER information, and when neither the first attribute nor the second attribute comprises a first identifier identifying an anycast BFR prefix.

5. The method of claim 2, wherein the first attribute comprises a first node identifier of the first device, wherein the second attribute comprises a second node identifier of the second device, wherein determining the next hop comprises determining, when the first BIER information is the same as the second BIER information, the first device or the second device as the next hop based on a policy, the first node identifier, and the second node identifier, and wherein the policy is based on device node identifier sizes.

6. The method of claim 2, wherein the first attribute comprises a second identifier identifying a first priority of the first device, wherein the second attribute comprises a third identifier identifying a second priority of the second device, wherein determining the next hop comprises determining, when the first BIER information is the same as the second BIER information, the first device or the second device as the next hop based on a policy, the second identifier, and the third identifier, and wherein the policy is based on device priorities.

7. The method of claim 1, wherein the first attribute comprises a first BFR prefix of the first device, wherein the second attribute comprises a second BFR prefix of the second device, wherein determining the next hop comprises determining, when the first BIER information is the same as the second BIER information, the first device or the second device as the next hop based on a policy, a first cost value of a first link from the third device to the first device, and a second cost value of a second link from the third device to the second device, and wherein the policy is based on link cost value sizes.

8. The method of claim 1, wherein the first attribute comprises a first BFR prefix of the first device, wherein the second attribute comprises a second BFR prefix of the second device, wherein determining the next hop comprises determining, when the first BIER information is the same as the second BIER information, the first device or the second device as the next hop based on a policy the first BFR prefix, and the second BFR prefix, and wherein the policy is based on BER prefix sizes.

9. The method of claim 1, wherein the first attribute comprises a first BFR prefix and a first node identifier, wherein the second attribute comprises a second BFR prefix and a second node identifier wherein determining the next hop comprises determining, when the first BIER information is the same as the second BIER information, the first device or the second device as the next hop based on a policy the first node identifier, and the second node identifier, and wherein the policy is based on node identifier sizes.

10. The method of claim 1, wherein the first attribute comprises a first BFR prefix and a second identifier identifying a first priority of the first device, wherein the second attribute comprises a second BFR prefix and a third identifier identifying a second priority of the second device, wherein determining the next hop comprises determining, when the first BIER information is the same as the second BIER information, the first device or the second device as the next hop based on a policy, the second identifier, and the third identifier, wherein the policy is based on device priorities.

11. A third device comprising:
a memory configured to store instructions; and
a processor coupled to the memory and configured to execute the instructions to cause the third device to:
obtain first Bit Index Explicit Replication (BIER) information of a first device, first attribute of the first device, second BIER information of a second device, and a second attribute of the second device, wherein the first BIER information and the second BIER comprise a bit forwarding router identifier (BFR-id) of an edge bit forwarding router (BFR) in a sub-domain; and
determine, based on the first BIER information, the second BIER information, the first attribute, and the second attribute, a next hop to the edge BFR in the sub-domain.

12. The third device of claim 11, wherein the processor is further configured to execute the instructions to cause the third device to further determine, when the first BIER information is the same as the second BIER information; and when the first attribute and the second attribute comprise a first identifier, identifying an anycast BER prefix, the next hop.

13. The device of claim 11, wherein the first attribute or the second attribute comprises a first identifier; identifying an anycast BFR prefix, and wherein the processor is further configured to execute the instructions to cause the third device to further determine, when the first BIER information is the same as the second BIER information, the next hop is a device whose attribute comprises the first identifier.

14. The third device of claim 11, wherein the processor is further configured to execute the instructions to cause the third device to output an alarm when the first BIER information is the same as the second BIER information and when neither the first attribute nor the second attribute comprises a first identifier identifying an anycast BER prefix.

15. The third device of claim 12, wherein the first attribute comprises a first node identifier of the first device, wherein the second attribute comprises a second node identifier of the second device, wherein the processor is further configured to execute the instructions to cause the third device to determine the next hop by determining, when the first BIER information is the same as the second BIER information, the first device or the second device as the next hop based on a policy, the first node identifier, and the second node identifier and wherein the policy is based on device node identifier sizes.

16. The third device of claim 12, wherein the first attribute comprises a second identifier identifying a first priority of the first device, wherein the second attribute comprises a third identifier; identifying a second priority of the second device, wherein the processor is further configured to execute the instructions to cause the third device to determine the next hop by determining, when the first BIER information is the same as the second BIER information, the first device or the second device as the next hop based on a policy, the second identifier, and the third identifier, and wherein the policy is based on device priorities.

17. The third device of claim 11, wherein the first attribute comprises a first BFR prefix of the first device, wherein the second attribute comprises a second BFR prefix of the second device, wherein the processor is further configured to execute the instructions to cause the third device to determine the next hop by determining when the first BIER information is the same as the second BIER information, the first device or the second device as the next hop based on a policy, a first cost value of a first link from the third device to the first device, and a second cost value of a second link from the third device to the second device, and wherein the policy is based on link cost value sizes.

18. The third device of claim 11, wherein the first attribute comprises a first BFR prefix of the first device, wherein the second attribute comprises a second BFR prefix of the second device, wherein the processor is further configured to execute the instructions to cause the third device to determine the next hop by determining, when the first BIER information is the same as the second BIER information, the first device or the second device as the next hop based on a policy, the first BFR prefix, and the second BFR prefix, and wherein the policy is based on BER prefix sizes.

19. The third device of claim 11, wherein the first attribute comprises a first BFR prefix and a first node identifier of the first device, wherein the second attribute comprises a second BFR prefix of the second device and a second node identifier of the second device, wherein the processor is further configured to execute the instructions to cause the third device to determine the next hop by determining, when the first BIER information is the same as the second BIER information, the first device or the second device as the next hop based on a policy, the first node identifier, and the second node identifier, and wherein the policy is based on node identifier sizes.

20. The third device of claim 11, wherein the first attribute comprises a first BFR prefix and a second identifier identifying a first priority of the first device, wherein the second attribute comprises a second BFR prefix and a third identifier identifying a second priority of the second device, wherein the processor is further configured to execute the instructions to cause the third device to determine the next hop by determining, when the first BIER information is the same as the second BIER information, the first device or the second device as the next hop based on a policy, the second identifier, and the third identifier, wherein the policy is based on device priorities.

\* \* \* \* \*

UNITED STATES PATENT AND TRADEMARK OFFICE
CERTIFICATE OF CORRECTION

PATENT NO. : 12,438,802 B2  
APPLICATION NO. : 18/309532  
DATED : October 7, 2025  
INVENTOR(S) : Jingrong Xie et al.

Page 1 of 2

It is certified that error appears in the above-identified patent and that said Letters Patent is hereby corrected as shown below:

In the Claims

Claim 2, Column 24, Line 2: "atypical BFR prefix, the next top hop." should read "anycast BFR prefix, the next hop."

Claim 4, Column 24, Line 11: "second BIER information, and when neither the first attri-" should read "second BIER information and when neither the first attri-"

Claim 8, Column 24, Line 50: "device as the next hop based on a policy the first BFR prefix," should read "device as the next hop based on a policy, the first BFR prefix,"

Claim 8, Column 24, Line 52: "on BER prefix sizes." should read "on BFR prefix sizes."

Claim 9, Column 24, Line 56: "and a second node identifier wherein determining the next" should read "and a second node identifier, wherein determining the next"

Claim 9, Column 24, Line 59: "or the second device as the next hop based on a policy the" should read "or the second device as the next hop based on a policy, the"

Claim 11, Column 25, Line 11: "mation of a first device, first attribute of the first" should read "mation of a first device, a first attribute of the first"

Claim 12, Column 25, Line 25: "information is the same as the second BIER information;" should read "information is the same as the second BIER information"

Claim 12, Column 25, Line 27: "a first identifier, identifying an anycast BER prefix, the next" should read "a first identifier identifying an anycast BFR prefix, the next"

Signed and Sealed this  
Second Day of December, 2025

John A. Squires  
*Director of the United States Patent and Trademark Office*

CERTIFICATE OF CORRECTION (continued)

U.S. Pat. No. 12,438,802 B2

Claim 13, Column 25, Line 29: "The device of claim 11, wherein the first attribute or" should read "The third device of claim 11, wherein the first attribute or"

Claim 13, Column 25, Line 30: "the second attribute comprises a first identifier; identifying" should read "the second attribute comprises a first identifier identifying"

Claim 14, Column 25, Line 41: "comprises a first identifier identifying an anycast BER" should read "comprises a first identifier identifying an anycast BFR"

Claim 15, Column 25, Line 52: "fier and wherein the policy is based on device node identifier" should read "fier, and wherein the policy is based on device node identifier"

Claim 16, Column 26, Line 1: "third identifier; identifying a second priority of the second" should read "third identifier identifying a second priority of the second"

Claim 17, Column 26, Line 14: "mine the next hop by determining when the first BIER" should read "mine the next hop by determining, when the first BIER"

Claim 18, Column 26, Line 31: "wherein the policy is based on BER prefix sizes." should read "wherein the policy is based on BFR prefix sizes."